(12) United States Patent
Tillin et al.

(10) Patent No.: US 6,577,364 B1
(45) Date of Patent: *Jun. 10, 2003

(54) REFLECTIVE LIQUID CRYSTAL DEVICE

(76) Inventors: Martin David Tillin, 11 Summer Fields, Abingdon, Oxfordshire, OX14 2PG (GB); Michael John Towler, 20 The Garth, Botley, Oxford OX2 9AL (GB); Kirstin Ann Saynor, Glantraeth, Gorad, Valley, Holyhead, Anglesey, Wales LL65 3BT (GB); Sandra Gilmour, 1 Mount Pleasant, Stow on the Wold, GL54 1AL (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/705,968

(22) Filed: Nov. 3, 2000

Related U.S. Application Data

(62) Division of application No. 08/961,212, filed on Oct. 30, 1997, now Pat. No. 6,204,904.

(30) Foreign Application Priority Data

Oct. 31, 1996 (GB) ............................................. 9622733

(51) Int. Cl.[7] ............................................. G02F 1/1335
(52) U.S. Cl. ...................... 349/119; 349/113; 349/115
(58) Field of Search ................................ 349/113, 115, 349/119, 117, 98, 100

(56) References Cited

U.S. PATENT DOCUMENTS

| 3,784,280 A | 1/1974 | Bigelow | 350/150 |
|---|---|---|---|
| 3,912,369 A | 10/1975 | Kashnow | 350/160 |
| 3,972,587 A | 8/1976 | Scheffer | 349/117 |
| 4,025,164 A | 5/1977 | Doriguzzi et al. | 349/97 |
| 4,232,948 A | 11/1980 | Shanks | 350/347 |

(List continued on next page.)

FOREIGN PATENT DOCUMENTS

| EP | 0298602 | 1/1989 |
|---|---|---|
| EP | 0448124 | 9/1991 |
| EP | 0576931 | 1/1994 |
| EP | 0616240 | 9/1994 |
| EP | 0679921 | 11/1995 |
| EP | 0699938 | 3/1996 |
| FR | 2596156 | 9/1987 |
| JP | 3581798 | 10/1983 |
| WO | 9631577 | 10/1996 |

OTHER PUBLICATIONS

European Search Report related to European Patent Application No. 97308853.7 dated Nov. 16, 1998.

G. Andersson, et al.; "Device Physics of the Soft–Mode Electro–Optic Effect"; Journal of Applied Physics, vol. 66, No. 10, Nov. 15, 1998; p. 4983–4995.

Search Report for Application No. GM9622733.5; Dated Jan. 9, 1997.

S. Pancharantnam, Proc. Ind. Acad. Sci., 41A, pp. 130–144; 1955, "Achromatic Combinations of Birefringent Plates", Parts I and II.

H. Seki et al., Mol. Cryst. Liq. Cryst., vol. 263, pp. 499–506; 1995; "Reflective Electrically Controlled Birefringence Mode LCDs".

(List continued on next page.)

*Primary Examiner*—Robert H. Kim
*Assistant Examiner*—Dung Nguyen

(57) ABSTRACT

A reflective liquid crystal device comprises a polarizer and a mirror between which are disposed several retarder. At least one of the retarders is a variable liquid crystal element whose optic axis is switchable so as to switch the device between a reflective state and a non-reflective state. In the non-reflective state, the total retardance of the retarders between the polariser and the mirror is equal to an odd number of quarter wavelengths for a wavelength at or adjacent the middle of the visible spectrum.

32 Claims, 34 Drawing Sheets

U.S. PATENT DOCUMENTS

| | | | | |
|---|---|---|---|---|
| 5,231,521 | A | 7/1993 | Johnson et al. | 349/119 |
| 5,243,455 | A | 9/1993 | Johnson et al. | 349/119 |
| 5,381,253 | A | 1/1995 | Sharp et al. | 349/119 |
| 5,392,142 | A | 2/1995 | Mitsutake et al. | 349/117 |
| 5,469,279 | A | 11/1995 | Sharp et al. | 349/117 |
| 5,568,283 | A | 10/1996 | Mitsutake et al. | 349/119 |
| 5,798,809 | A | 8/1998 | Nakamura et al. | 349/119 |
| 5,847,790 | A | 12/1998 | Andersson et al. | 349/117 |
| 6,204,904 | B1 * | 3/2001 | Tillin et al. | 349/119 |

OTHER PUBLICATIONS

H. Seki et al., Euro Display 96, pp. 464–467; 1996 "LP–F: A New Reflective Display with High Multiplexibility and Gray Scale Capability".

T. Uchida et al.; Asia Display '95; pp. 599–602; 1995, "Invited A Novel Reflective LCD for High Resolution Color Display".

T. Ishinabe et al.; Euro Display '96, pp. 119–122; 1996; "A Bright Full Color Reflective LCD Using Opticaly Compensated Bend Cell (R–OCB Cell) with Fast Response".

C.L. Kuo et al., Asia Display '95, pp. 135–138, 1995, Wide–Viewing–Angle Reflective LCD Using A Film–Compensated Han Cell with Single Polarizer.

S.T. Wu et al., Appl. Phys. Lett. vol. 68, No. 11, pp. 1455–1457, 1996, Mixed–Mode Twisted Nematic Liquid Crystal Cells for Reflective Displays.

I. Fukuda et al., IDRC, pp 201–204, 1994, "A New Achromatic Reflective STN–LCD with One Polarizer and One Retardation Film".

I. Fukuda et al., Journal of the SID 3/2, pp. 83–87, 1995, "A New Achromatic Reflective STN–LCD With One Polarizer and One Retardation Film".

I. Fukuda et al., Asia Display '95, pp. 881–884, 1995 Electro–Optical Properties of a Reflective STN–LCD with One Polarizer and One Retardation Film.

C.L. Kuo et al., Euro Display '96, pp. 387–390, 1996, "P45: Reflective Displays Using Mixed–Mode Twisted–Nematic Cells With Wide Viewing Angle and High Contrast".

* cited by examiner

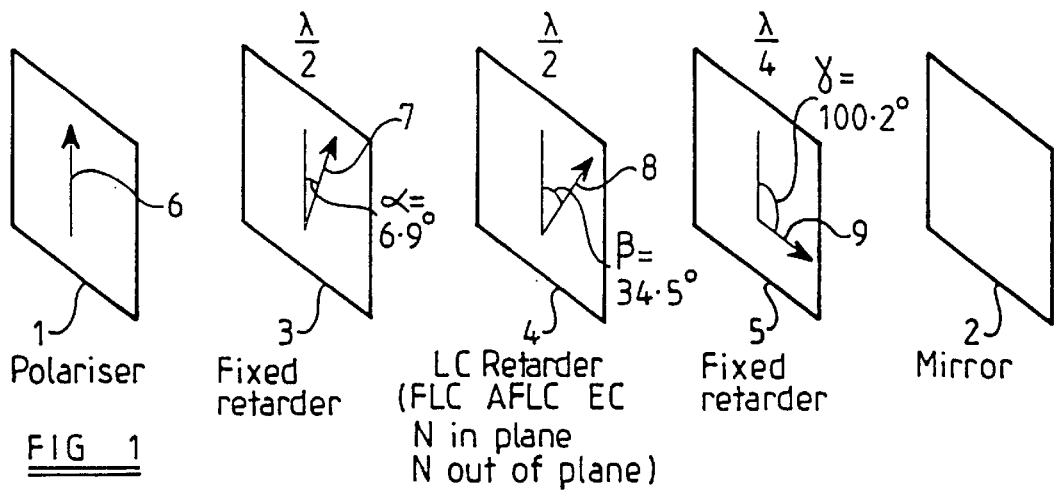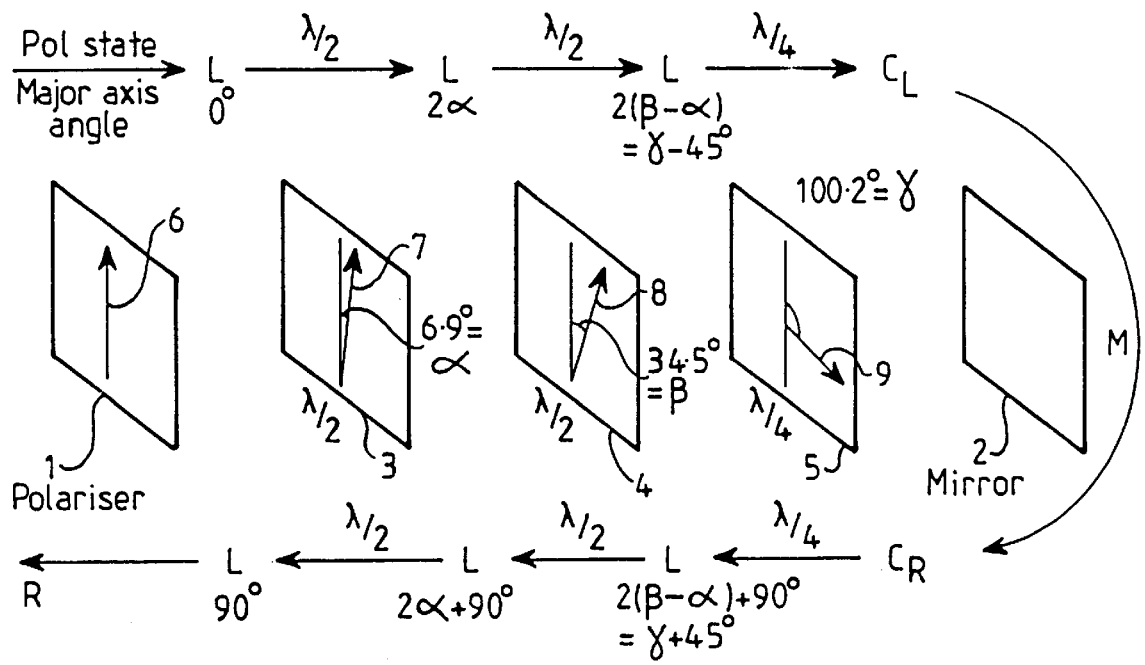

FIG. 37

Table 1: Normally Black Devices

| Fig No | Retarder R1 | | | Retarder R2 | | | Retarder R3 | | |
|---|---|---|---|---|---|---|---|---|---|
| | dΔn | Type | θ1 | dΔn | Type | θ2 | dΔn | Type | θ3 |
| 28 | λ/2 | +Δε | α | λ/4+τ | | 2α+45 | | | |
| 29 | λ/2 | R | α | σ | | 2α-45 | λ/4+σ | +Δε | 2α-45 |
| 27 | λ/2 | +Δε | α | λ/4+σ | | 2α+45 | σ | I | 2α-45 |
| 30 | λ/2 | R | α | λ/4+τ | | 2α+45 | λ/4+σ | -Δε | 2α-45 |
| 31 | λ/2 | -Δε | α | λ/4+σ | | 2α-45 | λ/4+τ | I | 2α+45 |

FIG. 38

Table 2 : Normally White Devices

| Fig No | Retarder R1 | | | Retarder R2 | | | Retarder R3 | | |
|---|---|---|---|---|---|---|---|---|---|
| | dΔn | θ1 | Type | dΔn | θ2 | Type | dΔn | θ3 | |
| 32 | λ/2 | α | -Δε | λ/4+σ | 2α+45 | | | | |
| 33 | λ/2 | α | -Δε | λ/4+σ | 2α+45 | I | σ | 2α-45 | |
| 34 | λ/2 | α | R | σ | 2α-45 | -Δε | λ/4+σ | 2α+45 | |
| 35 | λ/2 | α | +Δε | λ/4+σ | 2α-45 | I | λ/4+τ | 2α+45 | |
| 36 | λ/2 | α | R | λ/4+τ | 2α+45 | +Δε | λ/4+σ | 2α-45 | |

FIG. 39

Table 3 : Normally Black Devices

| Fig No | Retarder R1 | | Retarder R2 | | | Retarder R3 | | |
|---|---|---|---|---|---|---|---|---|
| | dΔn | θ1 | Type | dΔn | θ2 | Type | dΔn | θ3 |
| 28 | 265 | 15 | 6476 | 165 | 75 | | | |
| 29 | 265 | 15 | R | 40 | -15 | 6476 | 206 | 75 |
| 27 | 265 | 15 | 6476 | 180 | 75 | RM257 | 40 | -15 |
| 30 | 265 | 15 | R | 140 | 75 | 2806 | 170 | -15 |
| 31 | 265 | 15 | 2808 | 190 | -15 | RM257 | 170 | 75 |

FIG. 40

Table 4 : Normally White Devices

| Fig No | Retarder R1 | | Retarder R2 | | | Retarder R3 | | |
|---|---|---|---|---|---|---|---|---|
| | dΔn | θ1 | Type | dΔn | θ2 | Type | dΔn | θ3 |
| 32 | 265 | 15 | 2806 | 174 | 75 | | | |
| 33 | 265 | 15 | 2806 | 196 | 75 | RM257 | 30 | -15 |
| 34 | 265 | 15 | R | 30 | -15 | 2806 | 174 | 75 |
| 35 | 265 | 15 | 6474 | 200 | -15 | RM257 | 180 | 75 |
| 36 | 265 | 15 | R | 190 | 75 | 6476 | 190 | -15 |

FIG. 42

Table 5

| | Retarder R1 | | Retarder | | Retarder R3 | |
|---|---|---|---|---|---|---|
| | $\Delta n \cdot d_1$ | $\alpha/\theta_1$ | $\Delta n \cdot d_2$ | $\beta/\theta_2$ | $\Delta n \cdot d_3$ | $\gamma/\theta_3$ |
| 2 layer device | ±25% | ±10° | ±25% | ±10° | - | - |
| 3 layer device | ±40% | $2°<\alpha<25°$ | ±20% | $1<x<10$ | ±30% | ±15° |

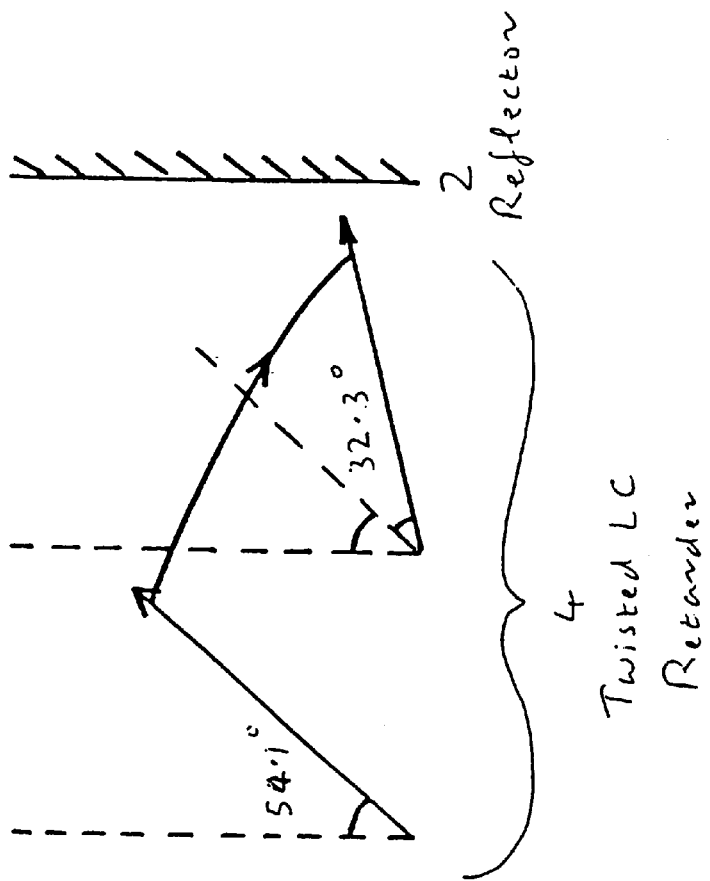
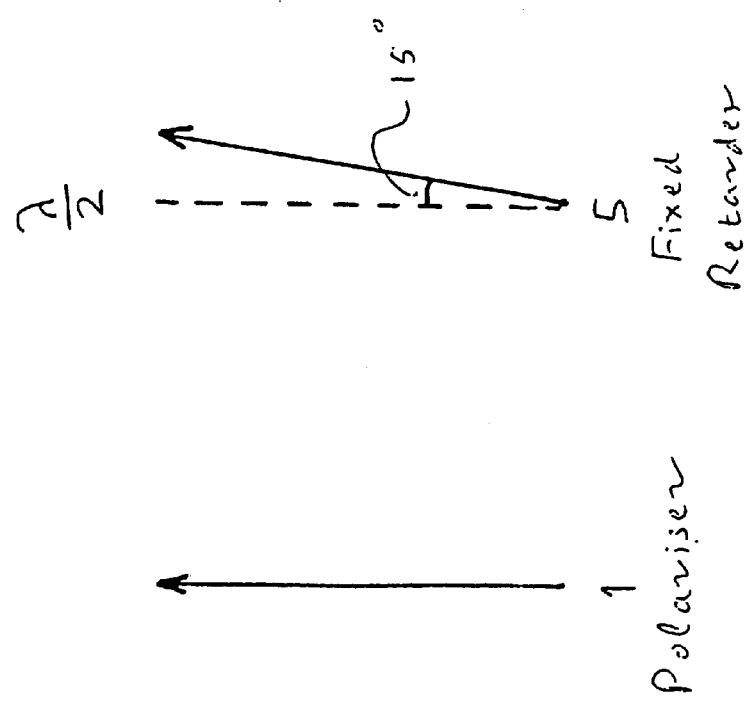
Fig 45

US 6,577,364 B1

REFLECTIVE LIQUID CRYSTAL DEVICE

This is a division of application Ser. No. 08/961,212, filed Oct. 30, 1997 now U.S. Pat. No. 6,204,904.

TECHNICAL FIELD OF THE INVENTION

The present invention relates to a reflective liquid crystal device. Such devices may be used, for instance, in hand-held and laptop equipment such as computers, diaries and personal organisers.

DESCRIPTION OF THE RELATED ART

Proc. Ind. Acad. Sci., 1955, 41A 130 and 137 disclose circular polarisers and quarter wave plates made of combinations of birefringent plates to provide improved achromaticity. The individual retarders are combined with different azimuthal orientations of their optic axes to achieve the improvement in achromatic performance.

Seki et al, Mol. Cryst. Liq. Cryst., 1995, 263, 499 and Seki et al, Eurodisplay, 1996, 464 disclose a liquid crystal device (LCD) of the reflective electrically controlled birefringence (ECB) type comprising a nematic liquid crystal and a quarter wave plate. The optic axis of the quarter wave plate is crossed with that of the nematic liquid crystal and is at 45° to a polariser disposed on one side of the nematic liquid crystal. The untwisted liquid crystal and quarter wave plate are disposed between the polariser and a mirror and a normally white state is achieved with the liquid crystal providing a retardation of $\lambda/4$. A black state is achieved by controlling the liquid crystal so as to provide zero retardation. This black state is effectively provided by the quarter wave plate and is achromatic only to the degree that the quarter wave plate is achromatic. A further retarder of negative birefringence with its optic axis perpendicular to its plane may be included to improve viewing angle performance.

Uchida et al, Asia Display, 1995, 599 discloses a reflective display in which a polariser and a mirror are disposed on opposite sides of a hybrid aligned nematic (HAN) liquid crystal layer and a retarder. The retarder is biaxial having an optic axis out of the plane to improve viewing angle and an in-plane optic axis which co-operates with the retardation of the liquid crystal layer to provide black and white states. The retarder in-plane axis is at 45° to the polarising axis of the polariser and is crossed with the optic axis of the liquid crystal layer. A normally black state is provided when the net retardation of the liquid crystal layer and the retarder is equal to $\lambda/4$. A white state is provided when the retardation of the liquid crystal is such that it cancels the retardation of the retarder. Such a display depends for its achromaticity on optimising the dispersion of the optical elements.

Ishinabe et al, Eurodisplay, 1996, 119 discloses a full colour reflective LCD in which a HAN liquid crystal layer and a biaxial retarder are disposed between a linear polariser and a mirror. The optic axis of the HAN layer is crossed with the optic axis of the retarder and is at 45° to the polarising axis of the polariser. A normally black state is achieved by making the difference between the retardations of the liquid crystal layer and the retarder equal to $\lambda/4$. Achromaticity is improved by adjusting the dispersion of materials of the liquid crystal layer and the retarder so that the birefringences partially compensate each other.

Kuo et al, Asia Display, 1995, 135 also discloses an LCD in which a HAN liquid crystal layer and a biaxial retarder are disposed between a linear polariser and a mirror. A dark state is provided when the total retardation is equal to an odd number of quarter wavelengths. The retarder has an in-plane optic axis which is crossed with the liquid crystal axis and is at 45° to the polariser axis. The display may be operated in the normally black mode, as described hereinbefore, or in the normally white mode, in which case a larger passive retarder is used. Achromaticity may be improved by optimising the dispersion of the elements or by adjusting the dispersion so that the birefringences compensate each other.

Wu et al, Applied Physics Letters, 1996, 68, 1455 discloses a reflective LCD in which a twisted nematic liquid crystal cell and a retarder are disposed between a polariser and a mirror. The twisted nematic liquid crystal cell has a twist angle of 90°, is relatively thin, and has its input director angled at 20° to the axis of the polariser. The retarder provides a retardation of $\lambda/4$ and has an optic axis angled at 45° to the polariser axis. The cell operates in the normally white mode where the retardations of the liquid crystal cell and the retarder cancel each other in the white state and the black state is obtained by reducing the retardation of the liquid crystal cell to zero. Accordingly, the achromaticity depends on the achromaticity of the retarder.

Kuo et al, Eurodisplay, 1996, 387 discloses a similar twisted nematic display which is operated in the normally white mode and again achieves a black state whose achromaticity depends on the achromaticity of the retarder.

Fukuda et al disclose in three papers (IDRC, 1994, 201; SID Journal, 1995, 3, 83; Asia Display 1995, 881) a reflective supertwisted nematic (STN) LCD comprising a single polariser and a single retardation film. The twist of the liquid crystal is between 220 and 260° and the device operates in the normally white mode. STN liquid crystal is used to allow high multiplex ratios i.e. small voltage differences between on and off voltages and hence a large value of d$\Delta$n of the liquid crystal, for instance greater than 0.6 micrometers. Achromaticity is improved by varying the dispersive properties of the liquid crystal and the retarder.

PCT WO 96/31577 discloses a reflective display comprising a linear polariser and a reflector between which are disposed a first retarder adjacent the polariser and a second retarder adjacent the reflector. The first retarder provides a retardation of $\lambda/2$ and has an optic axis aligned at 15° to the polarising direction of the polariser. The second retarder comprises a liquid crystal layer providing a retardation of $\lambda/4$ with an optic axis which is switchable in the plane of the retarder between angles of 75° and 120° with respect to the polarising direction.

SUMMARY OF THE INVENTION

According to a first aspect of the invention, there is provided a reflective liquid crystal device comprising a linear polariser, a polarisation preserving reflector, and a retarder arrangement, characterised in that the retarder arrangement comprises at least three retarders, a first of which is disposed between the polariser and the reflector, a second of which is disposed between the first retarder and the reflector, and a third of which is disposed between the second retarder and the reflector, at least one of the first, second and third retarders comprising a liquid crystal layer which is switchable between a non-reflective device state, in which the retardation of the retarder arrangement is equal to $(2n+1)\lambda/4$, where n is an integer and $\lambda$ is a wavelength of visible light, and a reflective device state.

In the non-reflective device state, the first retarder may have a retardation of substantially $\lambda/2$, the second retarder may have a retardation of substantially $\lambda/2$, and the third retarder may have a retardation of substantially $\lambda/4$.

In the non-reflective device state, the optic axis of the first retarder may be substantially at an angle of (α+B.180°) to the polarisation or absorption axis of the polariser, the optic axis of the second retarder may be substantially at an angle of (x.α+C.180°) to the polarisation or absorption axis, and the optic axis of the third retarder may be substantially at an angle of (2(β−α)+sign(α).45°+D.180°) to the polarisation or absorption axis, where x is a positive real number, B C and D are integers and sign (α) if the sign of α. α may be substantially equal to 6.90. x may be substantially equal to 5.

The first or second retarder may comprise the liquid crystal layer whose optic axis rotates during switching by an angle substantially equal to 22.5° about the normal direction of light passage.

The second retarder may comprise the liquid crystal layer and may have a retardation which is switchable between substantially (pλ/2+δ) and substantially ((p+1)λ/2+δ), where p is an integer and 0≦δ<λ/2. p may be equal to 0 or 1.

The third retarder may comprise the liquid crystal layer and may have a retardation which is switchable between substantially (qλ/4+δ) and substantially ((q+1)λ/4+δ), where q is an integer and 0≦δ<λ/4. q may be equal to 0 or 1.

The liquid crystal layer may be an out-of-plane switching nematic liquid crystal.

In the non-reflective device state, the first retarder may have a retardation of 23λ/72, the second retarder may have a retardation of λ/2, and the third retarder may have a retardation of 23λ/72.

In the non-reflective device state, the optic axis of the first retarder may be at an angle of substantially 14.25° to the polarisation or absorption axis of the polariser, the optic axis of the second retarder may be at an angle of substantially 84.5° to the polarisation or absorption axis, and the optic axis of the third retarder may be at an angle of substantially 14.25° to the polarisation or absorption axis.

The second retarder may comprise the liquid crystal layer whose optic axis rotates during switching by an angle substantially equal to 22.5° about the normal direction of light passage.

The second retarder may comprise the liquid crystal layer and may have a retardation which is switchable between substantially (rλ/2+δ) and substantially ((r+1)λ/2+δ), where r is in integer and 0≦δ<λ/2. r may be equal to 0 or 1.

The third retarder may comprise the liquid crystal layer and may have a retardation which is switchable between substantially 23λ/72 and substantially 23λ/324 or substantially 46λ/81.

The liquid crystal layer may be an out-of-plane switching nematic liquid crystal.

According to a second aspect of the invention, there is provided a reflective liquid crystal device comprising a linear polariser, a polarisation preserving reflector, and a retarder arrangement comprising a first retarder disposed between the polariser and the reflector and a second retarder disposed between the first retarder and the reflector, at least one of the first and second retarders comprising an untwisted liquid crystal layer which is switchable between a non-reflective device state, in which the retardation of the retarder arrangement is equal to (2n+1)λ/4, where n is an integer and λ is a wavelength of visible light, and a reflective device state, characterised in that the first retarder comprises the liquid crystal layer and has an optic axis which rotates during switching by a predetermined angle about the normal direction of light passage.

In the non-reflective device state, the first retarder may have a retardation of substantially λ/2 and the second retarder may have a retardation of substantially λ/4.

In the non-reflective device state, the optic axis of the first retarder may be substantially at an angle of (α+E.180°) to the polarisation or absorption axis of the polariser and the optic axis of the second retarder may be substantially at an angle of (2α+sign(α).45°+F.180°) to the polarisation or absorption axis, where E and F are integers and sign (a) is the sign of α.

α may be substantially equal to 15°.

α may be substantially equal to 22.5° and the predetermined angle may be substantially equal to 22.5°.

The liquid crystal layer may be a ferroelectric liquid crystal.

The liquid crystal layer may be an antiferroelectric liquid crystal.

The liquid crystal layer may be an electroclinic liquid crystal.

The liquid crystal layer may be an in-plane switching nematic liquid crystal.

According to a third aspect of the invention, there is provided a reflective liquid crystal device comprising a linear polariser, a polarisation preserving reflector, and a retarder arrangement comprising a first retarder disposed between the polariser and the reflector and a second retarder disposed between the first retarder and the reflector, at least one of the first and second retarders comprising an untwisted liquid crystal layer which is switchable between a non-reflective device state, in which the retardation of the retarder arrangement is equal to (2n+1)λ/4, where n is an integer and λ is a wavelength of visible light, and a reflective device state, characterised in that the liquid crystal layer is an out-of-plane switching liquid crystal.

In the non-reflective device state, the first retarder may have a retardation of substantially λ/2 and the second retarder may have a retardation of substantially λ/4.

In the non-reflective device state, the optic axis of the first retarder may be substantially at an angle of (α+E.180°) to the polarisation or absorption axis of the polariser and the optic axis of the second retarder may be substantially at an angle of (2α sign(α).45°F.180°) to the polarisation or absorption axis, where E and F are integers and sign (α) is the sign of α.

α may be substantially equal to 15°.

The first retarder may comprise the liquid crystal layer having a retardation which is switchable between substantially (pλ/2+δ) and substantially ((p+1)λ/2+δ), where p is an integer and 0≦δ<λ/2. p may be equal to 0 or 1.

The second retarder may comprise the liquid crystal layer and may have a retardation which is switchable between substantially (qλ/4+δ) and substantially ((q+1)'/4+δ), where q is an integer and 0≦δλ/4. q may be equal to 0 or 1.

The liquid crystal layer may be an out-of-plane switching nematic liquid crystal.

According to a fourth aspect of the invention, there is provided a reflective liquid crystal device comprising a linear polariser, a polarisation preserving reflector, and a retarder arrangement comprising a first retarder disposed between the polariser and the reflector and a second retarder disposed between the first retarder and the reflector, at least one of the first and second retarders comprising a liquid crystal layer which is switchable between a non-reflective device state, in which the retardation of the retarder arrangement is equal to $(2n+1)\lambda/4$, where n is an integer and $\lambda$ is a wavelength of visible light, and a reflective device state, characterised in that at least one of the first and second retarders comprises a twisted retarder.

The liquid crystal layer may comprise a homogeneously aligned nematic liquid crystal.

The liquid crystal layer may comprise a homeotropically aligned nematic liquid crystal.

The liquid crystal layer may be homogeneously aligned at a first surface and homeotropically aligned at a second surface.

The liquid crystal layer may be parallel-aligned.

The liquid crystal layer may be anti-parallel-aligned.

The retarder arrangement may comprise a further retarder whose optic axis is substantially perpendicular to the optic axis of the liquid crystal layer and which is disposed optically adjacent the liquid crystal layer.

The further retarder may have a retardation substantially equal to $\delta$.

The further retarder may have a retardation substantially equal to the retardation of the liquid crystal layer in the absence of an applied field across the liquid crystal layer.

n may be equal to 0.

$\lambda$ may be between substantially 500 and substantially 570 nanometers. $\lambda$ may be between substantially 510 and substantially 550 nanometers. $\lambda$ may be between substantially 525 and substantially 530 nanometers.

The retarder arrangement may have a retardation substantially equal to $m\lambda/2$ in the reflective device state, there m is an integer.

At least one of the first, second and third retarders may be a twisted retarder.

It is thus possible to provide an LCD which is suitable for use in reflective displays. High brightness and contrast are achieved in a reflective single polariser device which has a wide viewing angle and a fast response speed. For instance, it is possible to achieve an azimuthal viewing angle of greater than plus and minus 80° without contrast inversion and in all azimuthal directions. It is further possible to achieve a black state having a degree of achromaticity which is substantially improved compared with known displays of the single polariser and reflector type. The optic axes of the retarders are oriented such that the combinations gives a retardation of $\lambda/4$ for the input polarised light from the polariser over a wide range of wavelengths in the non-reflective or dark state. The dark state is therefore very dark and achromatic and this in turn gives high contrast when combined with the white state, which is also of high brightness. It is further possible to achieve a good achromatic reflective or white state. The retarders need not be made of the same material and the dispersive properties of the retarder materials are not substantially important for achieving achromaticity, although the best display is obtained by using identical materials of as low dispersion as possible.

Thus, a high brightness device is provided because of the use of a single polariser. Good achromatic behaviour permits high contrast to be achieved. The use of optically thin layers permits a wide viewing angle.

The present invention will be further described, by way of example, with reference to the accompanying drawings, in which:

BRIEF DESCRIPTION OF THE DRAWINGS

FIG. 1 is an exploded diagrammatic view of a reflective LCD constituting a first embodiment of the invention;

FIG. 2 corresponds to FIG. 1 but illustrates the polarisation states for the display of FIG. 1 in the black or non-reflective state;

FIG. 35 is a view similar to FIG. 1 of a display constituting a nineteenth embodiment of the invention;

FIGS. 37 to 40 are tables illustrating examples of the embodiments shown in FIG. 27 to 36;

FIG. 42 is a table illustrating the effect on performance of varying some of the parameters;

FIG. 45 is a view similar to FIG. 1 of a display constituting a twenty third embodiment of the invention.

BRIEF DESCRIPTION OF THE DRAWINGS

Figure 3:
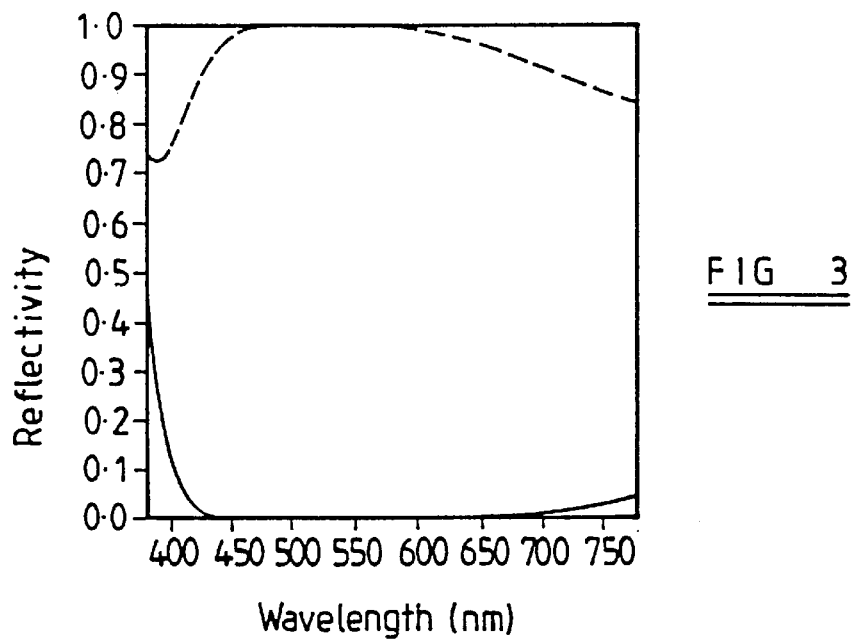
FIG. 3 is a graph of reflectivity against wavelength in nanometers illustrating the performance of the display of FIG. 1 using an antiferroelectric liquid crystal layer.

Like reference numerals refer to like parts throughout the drawings. The reflective LCD shown in FIG. 1 comprises a linear polariser 1, a polarisation-preserving reflector 2, a fixed retarder 3, a variable retarder 4, and a fixed retarder 5. The polariser has a polarisation or absorption axis 6 and the fixed retarder 3 has an optic axis 7 at an angle $\alpha$ to the axis 6. The fixed retarder 3 has a retardation such that it acts as a half wave plate at a wavelength $\lambda$ at the middle of the visible spectrum. The middle wavelength of the visible spectrum is normally considered to be 550 nanometers but, in order to maximise the achromaticity of the black state of the LCD, $\lambda$ is shifted slightly towards the blue end of the visible spectrum. A preferred value for $\lambda$ is in the range of 510 to 550 nanometers.

The variable retarder 4 comprises a liquid crystal layer which has an optic axis 8 at an angle $\beta$ to the axis 6 in the "normal" state of the liquid crystal. The liquid crystal may comprise a ferroelectric liquid crystal (FLC) whose optic axis is switchable by + or −22.50 although −22.50 is preferred. Alternatively, the liquid crystal may comprise an antiferroelectric liquid crystal (AFLC) whose optic axis 8 has two orientations, namely +22.50 in the bright or reflective state of the device. Smectic liquid crystals other than FLC and AFLC may be used and another possibility for the liquid crystal is an electroclinic (EC) (Chiral Smectic A) liquid crystal, which provides grey scale capability by azimuthally controlled optic axis orientation. A further possibility for the liquid crystal is a nematic in-plane switching liquid crystal which also has an azimuthally controlled optic axis orientation. In each of these cases, the LC retarder 4 provides a fixed retardation of $\lambda/2$.

In an alternative embodiment, the retarder 4 comprises a nematic out-of-plane liquid crystal whose optic axis is switched in and out of the plane of the retarder so as to vary the retardation by a difference of $\lambda/2$ between the bright or reflective and dark or non-reflective states of the LCD. It is preferred for the retardation to switch either between $\lambda$ and $\lambda/2$ or between $\lambda/2$ and close to zero.

The fixed retarder 5 has an optic axis 9 at an angle $\gamma$ to the axis 6. The fixed retarders 3 and 5 may be made from any suitable anisotropic material, such as a liquid crystal polymer or a reactive mesogen which is cross-linked to form a polymer. The liquid crystal retarder 4, when of the nematic type, may be a Fredericks cell, a HAN cell, or a Pi cell.

The angles $\alpha$, $\beta$ and $\gamma$ are related to each other in that $\beta = x\alpha$ and $\gamma = 2(\beta - \alpha) + 45°$. Preferred values are $\alpha = 6.9°$ and x=5 which gives preferred values of 34.5° for $\beta$ and 100.2° for $\gamma$.

All angles of optic axes and alignment directions disclosed herein may be rotated by $A\pi$ radians, where A is an integer, without affecting the performances of the devices. Also, the choice of the sign of the angles is arbitrary and positive angles may be measured either clockwise or anticlockwise with respect to a reference direction. The angles $\alpha$, $\beta$ and $\gamma$ may therefore be defined more generally as:

$$\alpha + B. \ 180°$$

$$\beta = x\alpha + C. \ 180°$$

$$\gamma = 2(\beta - \alpha) + \text{sign}(\alpha) \ 45° + D \ 180°$$

where x is a positive real number, B, C and D are integers and sign ($\alpha$) is the sign of $\alpha$.

As mentioned hereinbefore, the axis 6 of the polariser 1 may be the polarising axis or the absorption axis, which is orthogonal to the polarising axis. Thus, the devices disclosed herein function substantially equally well with the polarising axis as the axis 6 or orthogonal thereto. For the sake of simplicity of description, the embodiments disclosed herein have been described with the polarising axis of the polariser 1 as the axis 6.

FIG. 2 illustrates the light path and polarisation states of light through the LCD of FIG. 1 for the non-reflecting or dark state of the LCD at a wavelength $\lambda$ which is the "design" wavelength of the retarders. Linear polarisations are indicated by "L", left handed circular polarisation is indicated by "$C_L$" and right handed circular polarisation is indicated by "$C_R$". Unpolarised light incident on the polariser 1 is linearly polarised with the polarisation vector at an angle of zero degrees to the polarising axis 6. The half wave plate formed by the fixed retarder 3 rotates the polarisation vector by $2\alpha$ and the half wave plate formed by the retarder 4 further rotates the polarisation vector to $\gamma$-45°. The quarter wave plate formed by the retarder 5 converts the light to left handed circularly polarised which is converted by reflection by the mirror 2 to right handed circularly polarised light. The quarter wave plate 5 converts the light back to linearly polarised with the polarisation vector at an angle of $\gamma$+45°. The half wave plate 4 rotates the polarisation vector to $2\alpha$+90° and the half wave plate 3 rotates the polarisation vector to 90°. The polarisation vector of the reflected light incident on the polariser 1 is orthogonal to the polarising axis 6 so that the reflected light is absorbed by the polariser 1. The retardations provided by the retarders 3, 4 and 5 are not exactly $\lambda/2$ and $\lambda/4$ for wavelengths which differ from the "design" wavelength. Accordingly, the effects of the retarders 3, 4 and 5 differ slightly from the description given hereinbefore. However, the angles $\alpha$, $\beta$ and $\gamma$ of the optic axes 7, 8 and 9 are such that the polarisation vector of the light reflected back to the polariser 1 differs little from linear at 90° to the original direction. Thus, a good achromatic black state is provided by the LCD. An optimum dark state is achieved if the dispersions of the refractive indices are identical for all of the retarders. However, this is not essential and adequate results can be obtained even if the dispersions are very different.

In order to provide a reflective or white state, the liquid crystal retarder 4 is switched so that the optic axis 8 rotates as described hereinbefore for the various types of liquid crystals. This results in the light reflected back to the polariser 1 having a polarisation vector which is linear at or close to zero degrees throughout the visible spectrum, thus giving a good achromatic white state.

FIG. 3 is a graph of reflectivity against wavelength in nanometers illustrating the performance of the LCD of FIG. 1 with the liquid crystal retarder 4 embodied by AFLC. The unbroken line illustrates reflectivity in the black state whereas the broken line illustrates reflectivity in the white state. Throughout most of the visible spectrum, the reflectivity in the black state is substantially equal to zero but rises at the blue and red extremes of the spectrum. The reflectivity rises more quickly at the blue end of the spectrum, which is why the "design" wavelength $\lambda$ is chosen to be displaced towards the blue end compared with the actual center of the visible spectrum so as to improve the achromaticity of the black state. The reflectivity in the white state is a maximum throughout a substantial portion of the visible spectrum but falls towards the blue and red ends. However, a reasonably achromatic white state is achieved. Further, the difference between reflectivities in the black and white states throughout the spectrum is relatively high. A bright display with good contrast performance throughout the spectrum is therefore provided. Because the individual layers and the whole device are relatively thin, the device has a good range of viewing angles. In particular, a range of ±18° of azimuth angle for all polar angles can be achieved without contrast inversion i.e. the dark state becoming brighter than the bright state.

Figure 4:
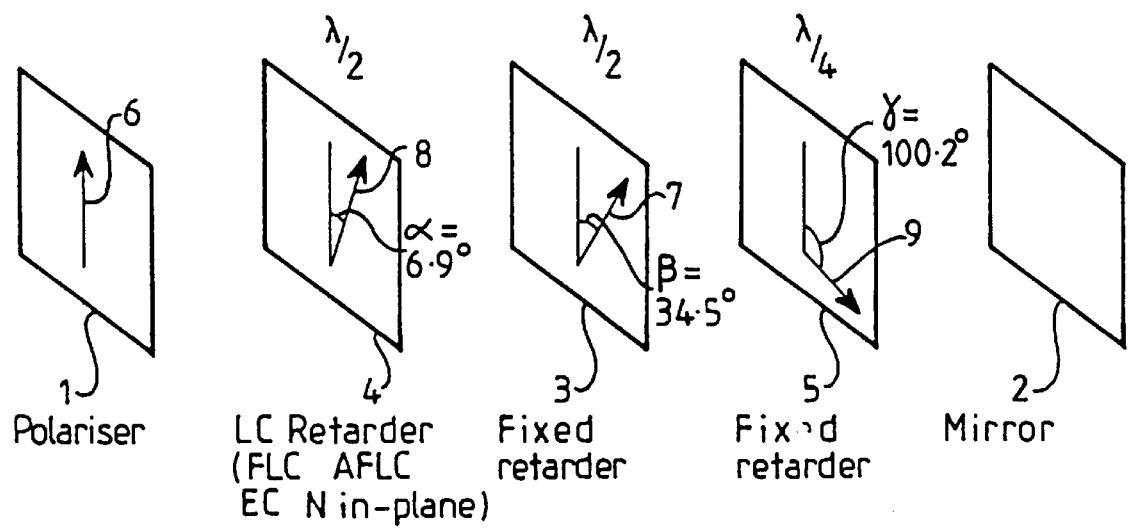
FIG. 4 is a view similar to FIG. 1 of another display constituting a second embodiment of the invention.

The reflective LCD shown in FIG. 4 differs from that shown in FIG. 1 in that the liquid crystal retarder 4 is disposed between the polariser 1 and the fixed retarder 3 instead of between the fixed retarders 3 and 5. The liquid crystal retarder 4 may be embodied by FLC, AFLC, EC, and nematic in-plane liquid crystal. Operation in the dark or black state is substantially identical to that of the LCD of FIG. 1 as illustrated in FIG. 2.

Figure 5:
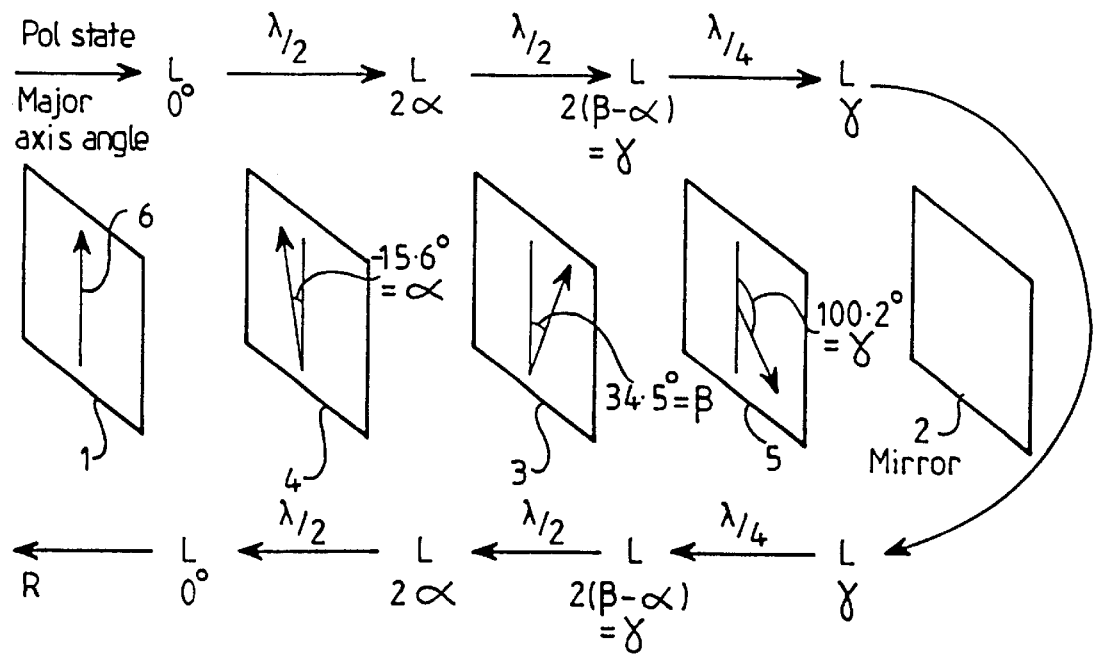
FIG. 5 illustrates the polarisation states for operation of the display of FIG. 4 in a white or reflective state.

FIG. 5 illustrates operation of the LCD of FIG. 4 in the bright or white state with the optic axis of the liquid crystal retarder 4 switched by −22.5° to be at −15.6° to the polarising axis 6. Unpolarised light incident on the polariser 1 is linearly polarised with a polarisation vector at zero degrees to the axis 6. The polarisation vector is rotated by the retarder 4 to 2α and is further rotated by the retarder 3 to γ. The polarisation vector is unaffected by passage of the light both ways through the retarder 5 and by reflection at the mirror 2 so that the reflected light is incident on the retarder 3 with a polarisation vector at an angle of γ. the retarder 3 rotates the polarisation vector to 2α and the retarder 4 rotates the polarisation vector to zero degrees. The polarisation vector of the light reflected back to the polariser 1 is therefore parallel to the polarising axis 6 and the reflected light thus returns out of the LCD substantially unattenuated.

Figure 6:
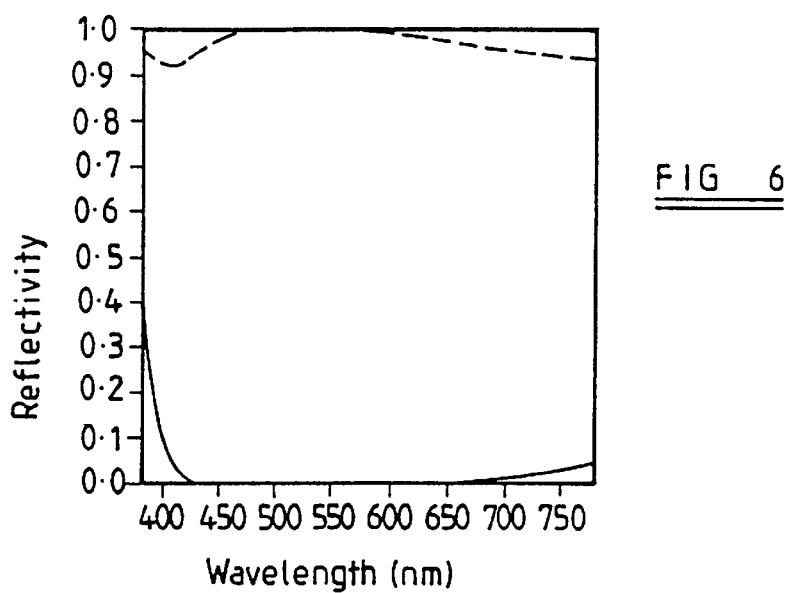
FIG. 6 is a graph similar to FIG. 3 illustrating the performance of the display of FIG. 4 for a ferroelectric liquid crystal.

The performance of the LCD of FIG. 4 is shown in FIG. 6. The reflectivity in the dark state is substantially identical to that illustrated in FIG. 3 and the reflectivity in the bright state is improved with respect that shown in FIG. 3 so that the brightness and achromaticity are slightly improved together with the contrast ratio between the states throughout the visible spectrum.

Figure 7:
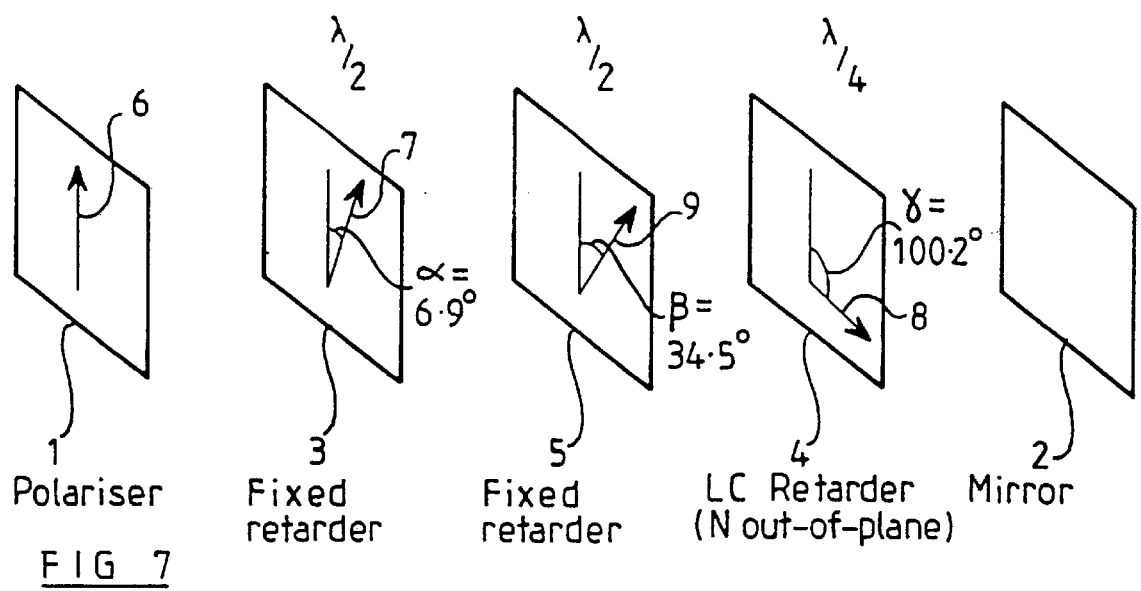
FIG. 7 is a view similar to FIG. 1 of a display constituting a third embodiment of the invention.

The LCD shown in FIG. 7 differs from that shown in FIG. 1 in that the variable liquid crystal retarder 4 forms the quarter wave plate adjacent the mirror 2. The retarder 4 is embodied as a nematic out-of-plane liquid crystal whose optic axis 8 is switchable in and out of the plane of the retarder 4 to vary the retardation between two values which differ from each other by $\lambda/4$. It is preferred for the retardation to be switched between $\lambda/2$ and $\lambda/4$ or between $\lambda/4$ and substantially zero.

Figure 9:
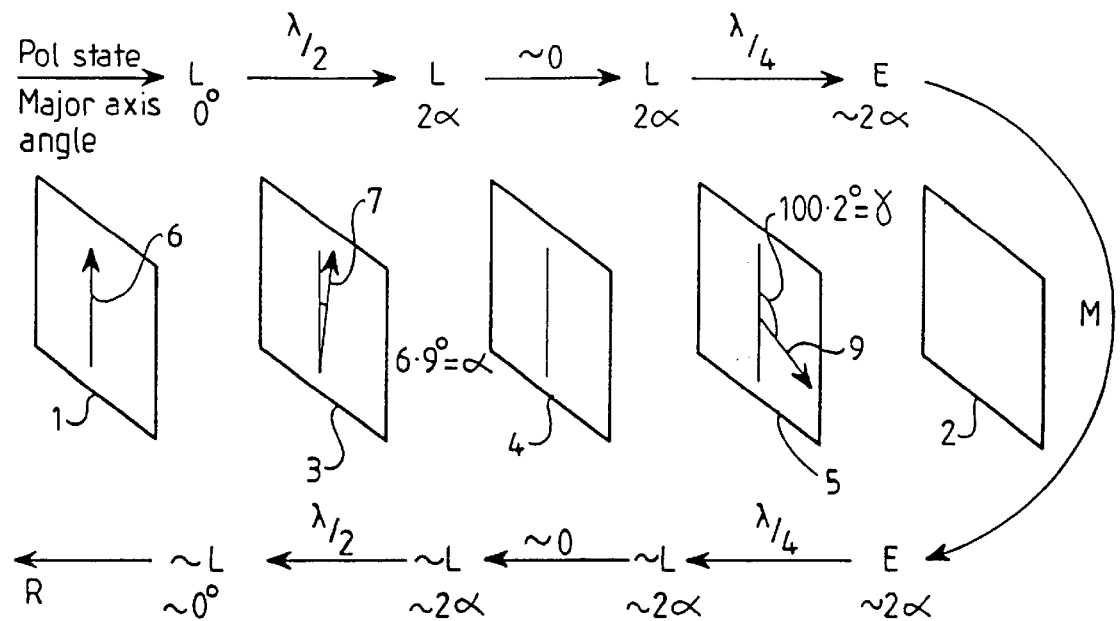
FIG. 9 illustrates polarisation states for the display of FIG. 1 in which the liquid crystal layer is of the nematic out-of-plane type.

FIG. 9 illustrates operation of the LCD of FIG. 1 in the bright state when the retarder 4 is embodied as a nematic out-of-plane liquid crystal. In this mode of operation, the retarder 4 provides close to zero retardation or $\lambda/2$ retardation and has substantially no effect on the passage of light. Unpolarised light incident on the polariser 1 is linearly polarised to have a polarisation vector at zero degrees to the polarising axis 6. The retarder 3 rotates the polarisation vector to 2α which passes through the retarder 4 with little or no change. The retarder 5 converts the light to slightly elliptically polarised (E) with the major axis at 2α to the polarising axis 6. The elliptically polarised light is reflected by the mirror 2 without substantially affecting its state of polarisation. The light is therefore converted by the retarder 5 to substantially linearly polarised light with the polarisation vector at substantially 2α. The retarder 4 has no effect so that the retarder 3 rotates the polarisation vector to substantially zero degrees with respect to the polarising axis 6. The reflected light is thus transmitted by the polariser 1.

Figure 8:
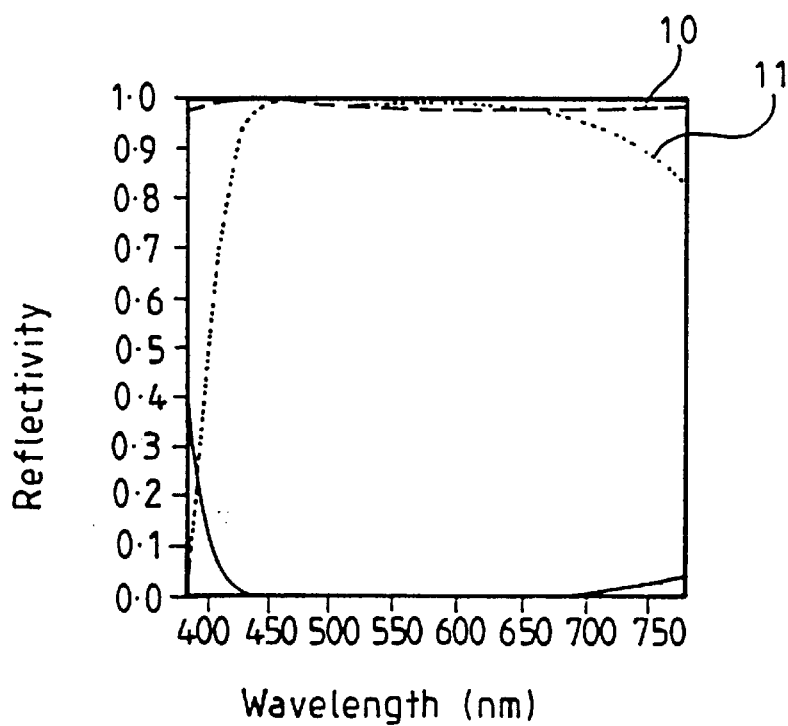
FIG. 8 is a graph similar to that of FIG. 3 illustrating performance of the display of FIG. 1 with a nematic out-of-plane liquid crystal.

The performance of the LCD whose operation is illustrated in FIG. 9 is represented by the curves 10 and 11 in FIG. 8. The curve 10 is for $\lambda/2$ to ~0 whereas the curve 11 is for $\lambda/2$ to $\lambda$. A display of high contrast and brightness with good achromatic bright and dark states is provided. At voltages between the dark and bright state voltages, reflectivities between the dark and bright states are produced and are of good achromaticity.

In the displays shown in FIGS. 1, 4 and 7, the combination of the retarders 3, 4 and 5 together with the linear polariser 1 in the dark state acts like a circular polariser. In the display shown in FIG. 10, combination of the retarders 3, 4 and 5 acts as a quarter wave plate. The fixed retarder 3 acts as a $23\lambda/72$ wave plate whose optic axis α is at 14.25° to the polarising ax:.s 6 of the polariser 1. The variable liquid crystal retarder 4 acts, in the dark state, as a half wave plate whose optic axis 8 is at 84.5° to the polarising axis 6. The fixed retarder 5 is substantially identical to the fixed retarder 3. The variable retarder 4 may be embodied by FLC, AFLC, EC, and nematic in-plane liquid crystal providing a fixed retardation of $\lambda/2$ but with the optic axis 8 switchable by + or −22.5° between the bright and dark states of the LCD. When embodied by nematic out-of-plane liquid crystal, the optic axis of the retarder 4 is switchable in and out of the plane of the retarder and the retardation is switchable between states which differ by $\lambda/2$, preferably between $\lambda/2$ and zero or between $\lambda$ and $\lambda/2$.

Figure 10:
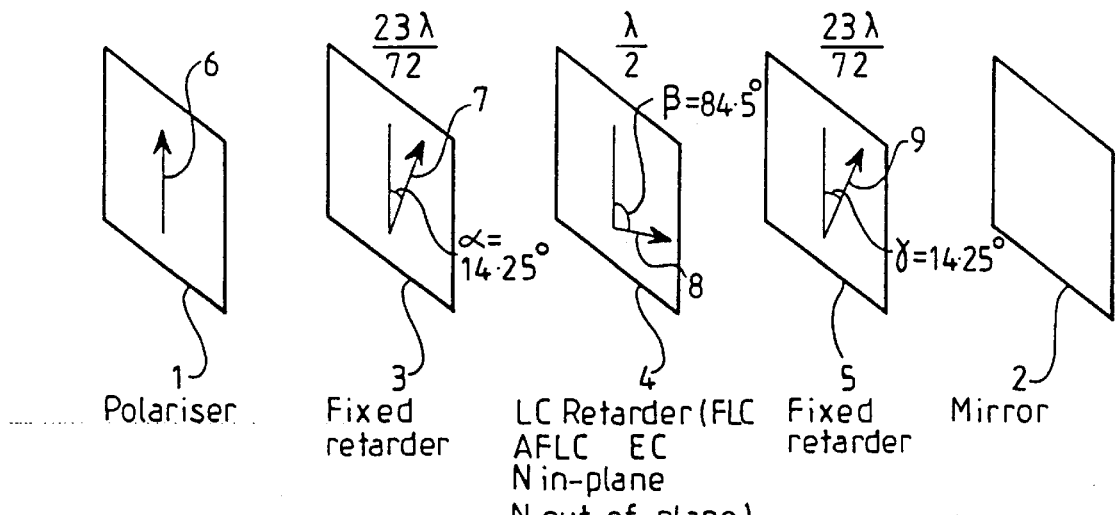
FIG. 10 is a view similar to FIG. 1 of a display constituting a fourth embodiment of the invention.
Figure 11:
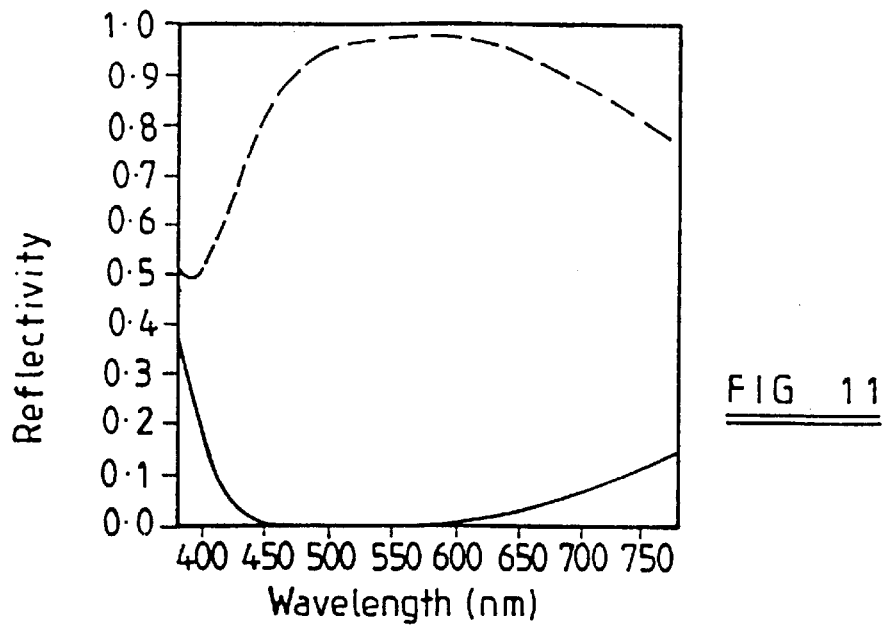
FIG. 11 is a graph similar to FIG. 3 showing the performance of the display of FIG. 10 using antiferroelectric liquid crystal.

As shown in FIG. 11, the LCD of FIG. 10 also provides good performance in terms of achromaticity of dark and bright states, brightness and contrast ratio throughout the visible spectrum.

Figure 12:
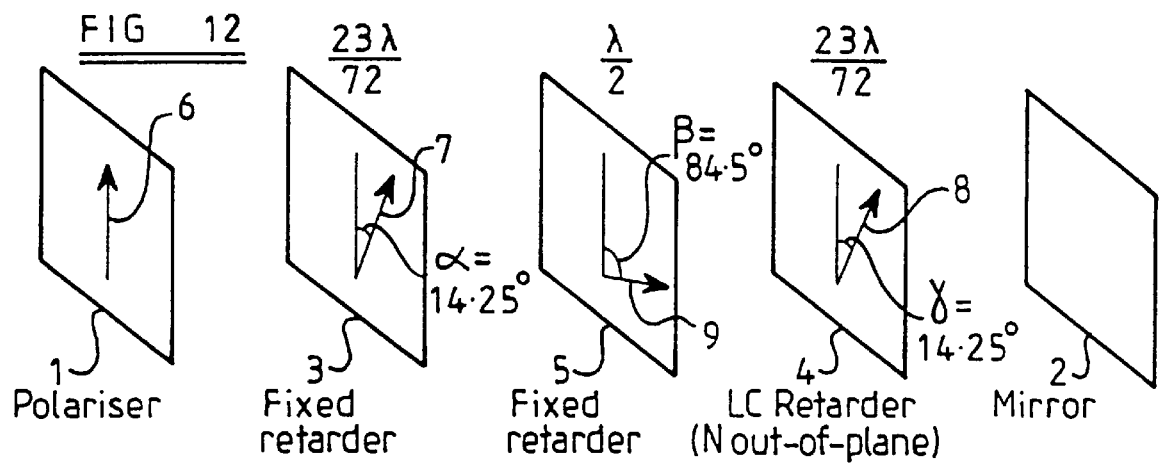
FIG. 12 is a view similar to FIG. 1 of a display constituting a fifth embodiment of the invention.

The LCD of FIG. 12 differs from that shown in FIG. 10 in that the variable liquid crystal retarder 4 is disposed adjacent the mirror 2. The retarder 4 is embodied as a nematic out-of-plane liquid crystal whose optic axis 8 switches in and out of the retarder plane so as to vary the retardance between $23\lambda/72$ and $23\lambda/324$ or between $23\lambda/72$ and $46\lambda/81$ to give linear polarisation states at the mirror 2.

Figure 13:
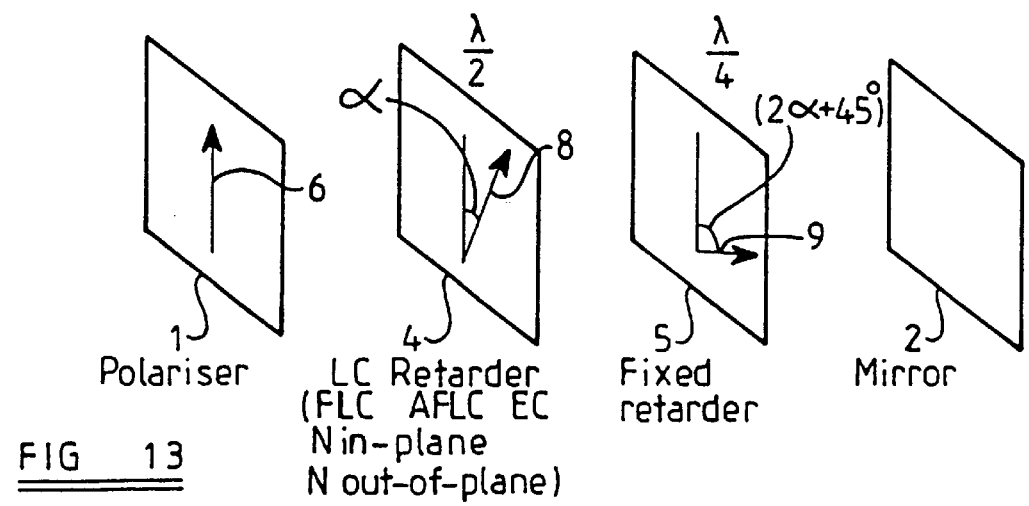
FIG. 13 is a view similar to FIG. 1 of a display constituting a sixth embodiment of the invention.

The LCD of FIG. 13 differs from that of FIG. 1 in that only two retarders are disposed between the polariser 1 and the mirror 2. The first retarder comprises a variable liquid crystal retarder 4 which may be embodied by FLC, AFLC, EC, nematic in-plane liquid crystal and nematic out-of-plane liquid crystal as described hereinbefore. The optic axis 8 is at an angle α to the polarising axis 6 of the polariser 1. In the black state, the retarder 4 acts as a half wave plate.

The fixed retarder 5 acts as a quarter wave plate and has an optic axis 9 at an angle β of (2α+45°) to the polariser axis 6. Although the optimum value for α in terms of achromaticity of the display is 15°, this optimum angle is not available for all embodiments of the liquid crystal retarder 4. For some cases, a value of 22.5° is chosen for α. Operation of the retarder 4 is then as described hereinbefore for the different liquid crystal embodiments.

The angles α and β may be defined more generally as:

$$\alpha + E \cdot 180°$$

$$\beta = 2\alpha + \text{sign}(\alpha)\ 45° + F\ 180°$$

where E and F are integers.

Figure 14:
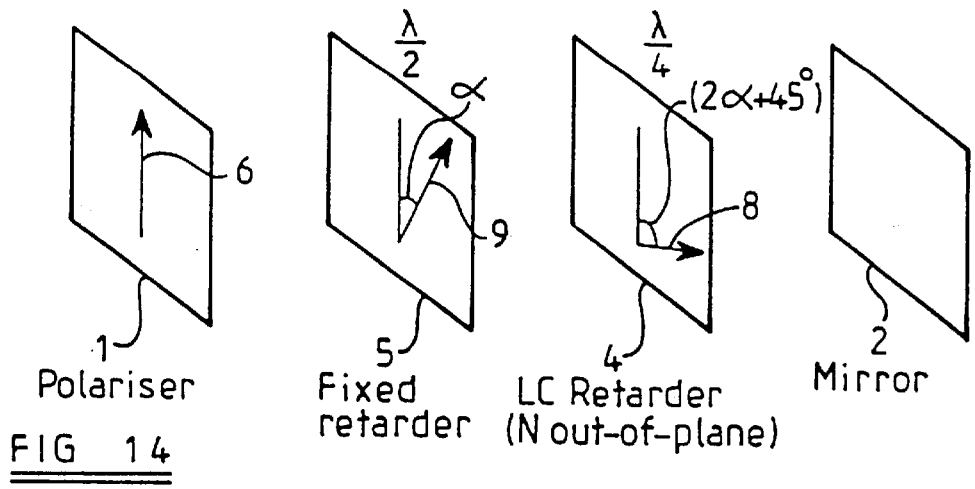
FIG. 14 is a view similar to FIG. 1 of a display constituting a seventh embodiment of the invention.

FIG. 14 shows an LCD which differs from that shown in FIG. 13 in that the liquid crystal retarder 4 is now disposed adjacent the mirror 2. The retarder 4 comprises a nematic out-of-plane liquid crystal and operates as described hereinbefore with reference to FIG. 7.

Figure 15:
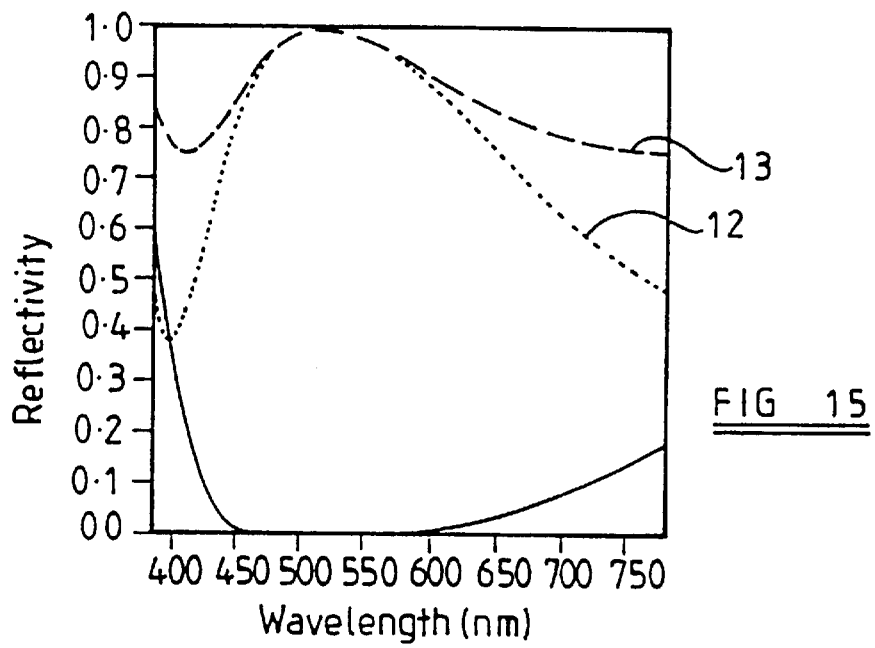
FIG. 15 is a graph similar to FIG. 3 showing the performance of the display of FIG. 14.

The performances of the LCDs shown in FIGS. 13 and 14 are illustrated in FIG. 15. The dark state reflectivity is substantially identical for both LCDs of FIGS. 13 and 14 and, although not as good as the "three retarder" devices described hereinbefore, nevertheless provides a good achromatic black state. Curve 12 illustrates the bright state performance of FIG. 14 with the liquid crystal at a retardation of λ/2 whereas curve 13 illustrates the bright state performance of the LCD of FIG. 14 with the liquid crystal at a retardation of 0. Bright displays of good contrast ratio and good achromaticity are provided and give extended viewing angles.

Figure 16:
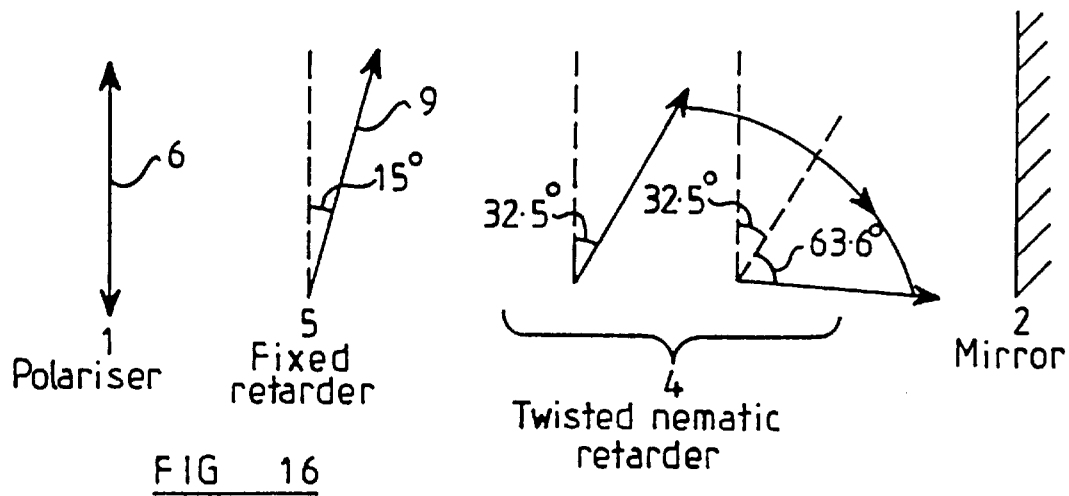
FIG. 16 is a schematic diagram of a display constituting an eighth embodiment of the invention.

The LCD shown in FIG. 16 comprises a two retarder device in which the first retarder 5 is fixed with its optic axis 9 at 15° to the polarising axis 6 of the polariser 1. The retarder 5 has a thickness of 1168 nanometers and is made of RM 258 available from Merck. The twisted nematic retarder 4 comprises a chiral retarder having a twist of 63.6° with its input director at an angle of 32.5° to the polariser axis 6. The fixed retarder 5 has an optical retardation (d.Δn) of 152.5 nanometers.

In the light state, the retarder 4 is switched to provide close to zero retardation.

Figure 17:
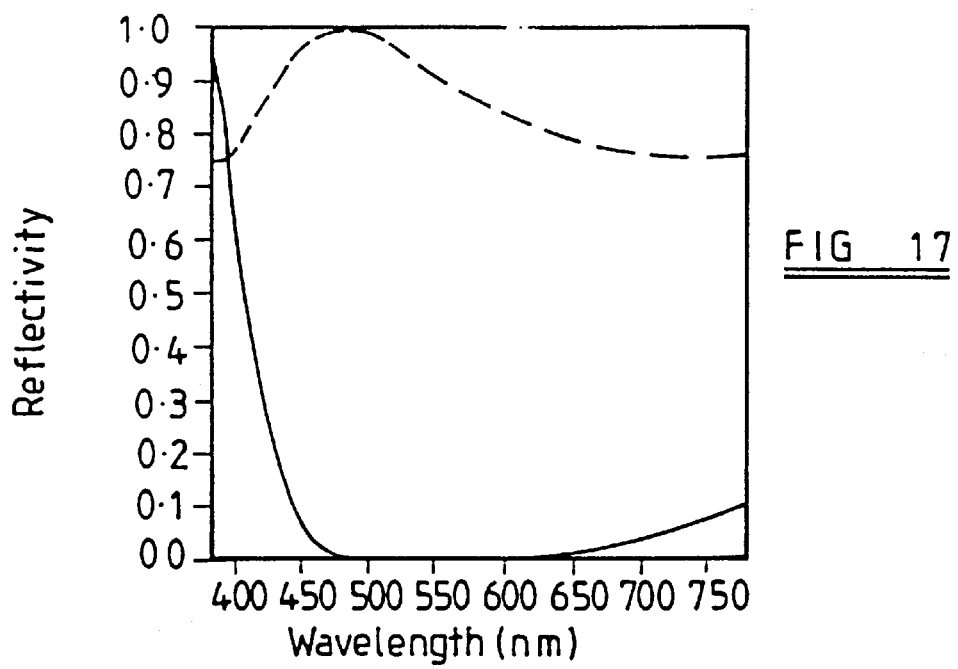
FIG. 17 shows a graph similar to FIG. 3 illustrating the performance of the display of FIG. 16.

FIG. 17 illustrates the reflectivity of the LCD of FIG. 16.

Figure 18:
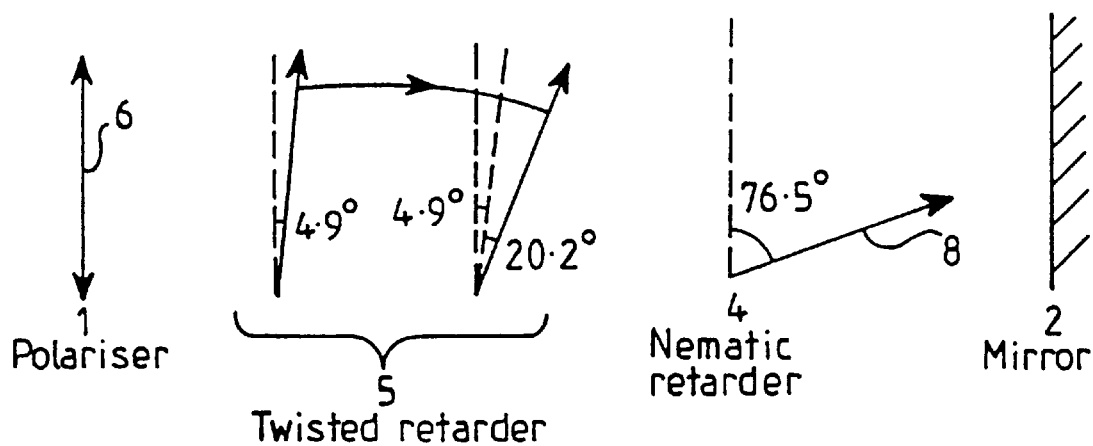
FIG. 18 is a view similar to that of FIG. 16 of a display constituting a ninth embodiment of the invention.

The LCD shown in FIG. 18 comprises a fixed twisted retarder 5 and a nematic out-of-plane liquid crystal retarder 4 disposed between the polariser 1 and the mirror 2. The retarder 5 has an input director at an angle of 4.9° to the polariser axis 6 and a twist angle of 20.2°. The retarder 5 is made of RM 258 and has a thickness of 1690 nanometers.

The nematic retarder 4 has a thickness of 600 nanometers for material with the same birefringence as RM 258 and an optic axis at 76.5° to the polariser axis 6 in the dark state. The retarder is switched to either twice the optical retardation, corresponding to a half wave retardation, or to zero optical retardation, corresponding to zero retardation, to switch the device to the bright state.

Figure 19:
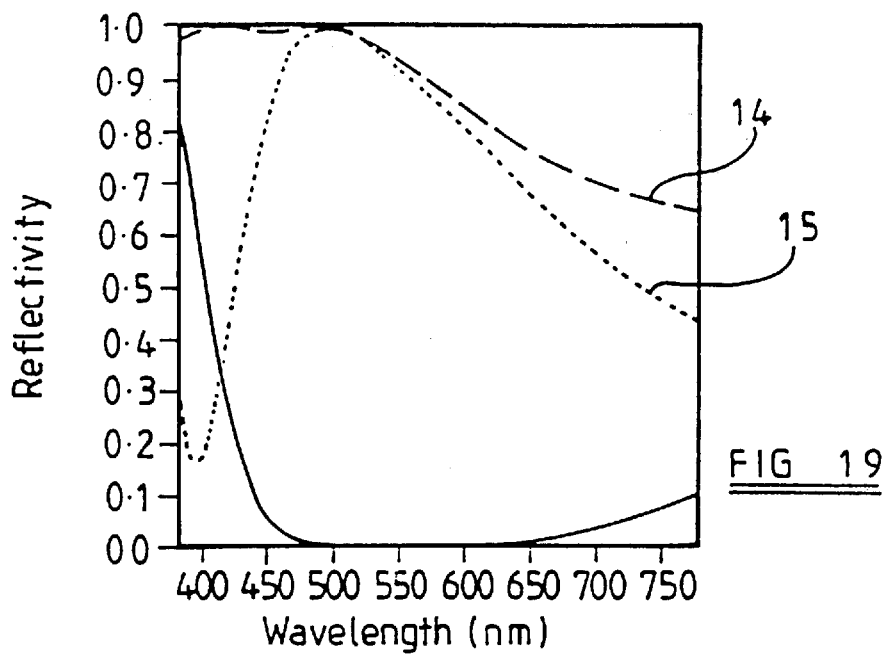
FIG. 19 shows a graph similar to that of FIG. 3 illustrating performance of the display of FIG. 18.

The performance of the LCD shown in FIG. 18 is illustrated by FIG. 19. The bright state for the retarder switched to zero retardation is illustrated by curve 14 and for the retarder 4 switched to the half wave retardation by curve 15.

Figure 20:
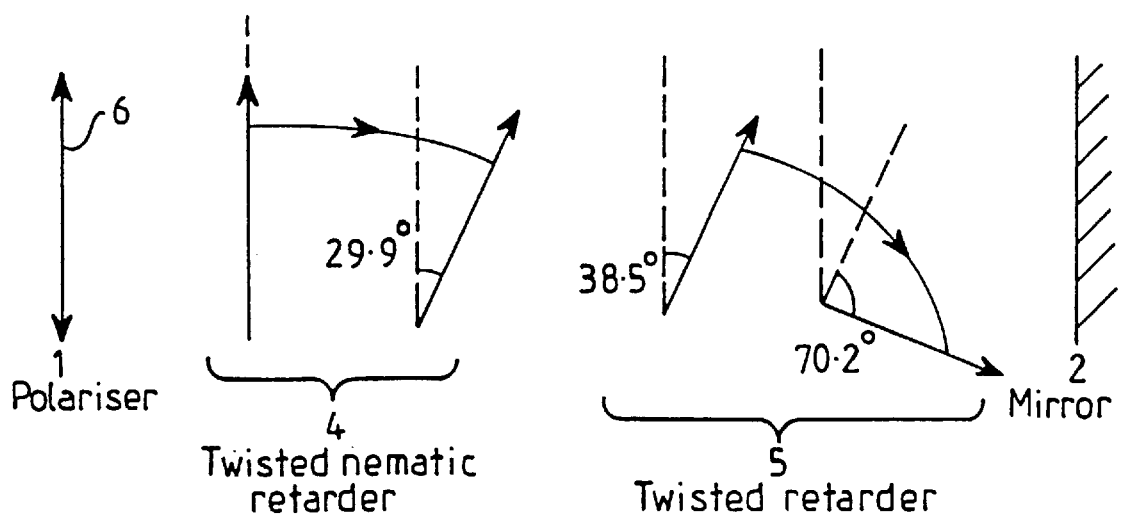
FIG. 20 is a view similar to FIG. 16 of a display constituting a tenth embodiment of the invention.
Figure 21:
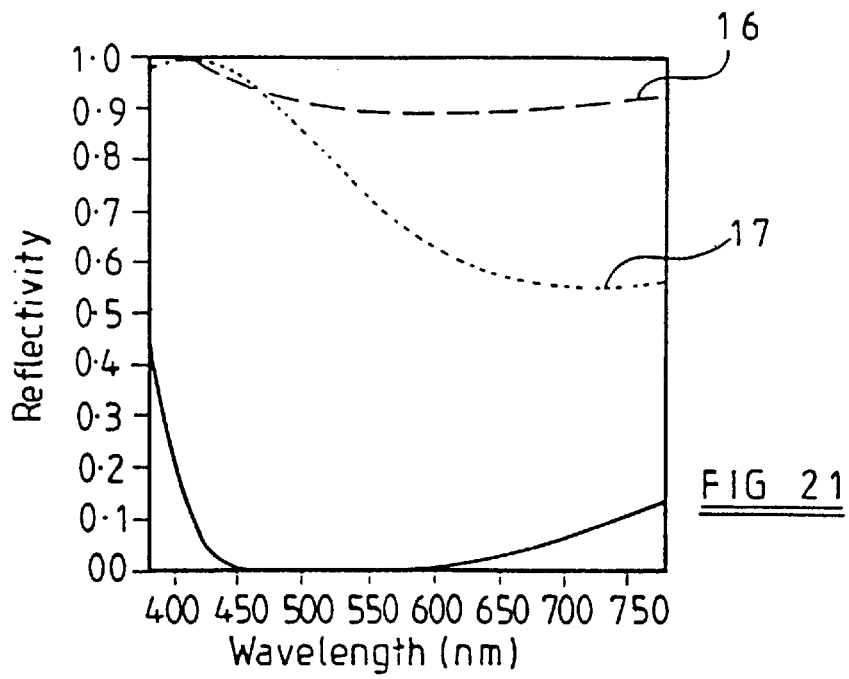
FIG. 21 shows a graph similar to FIG. 3 illustrating performance of the display of FIG. 20.

The LCD shown in FIG. 20 comprises two twisted retarders 4 and 5 between the polariser 1 and the mirror 2. The retarder 4 comprises a nematic liquid crystal whose input director is aligned with the polarising axis 6 of the polariser 1. The retarder 4 has a twist of 29.9° and a thickness of 1586 nanometers when made of RM 258 type material. The fixed twisted retarder 5 has an input director at an angle of 38.5° to the polarising axis 6, a twist of 70.2° and a thickness of 658 nanometers when made of RM 258. FIG. 21 illustrates the performance of the LCD of FIG. 20. The curve 16 represents the bright state performance whereas the curve 17 represents the bright state performance of a device which differs from that shown in FIG. 20 in that the retarder adjacent the polariser is fixed and the retarder adjacent the mirror is switchable. For the device shown in FIG. 20, the bright state is obtained by switching the retardation of the retarder 4 to substantially zero.

Figure 22:
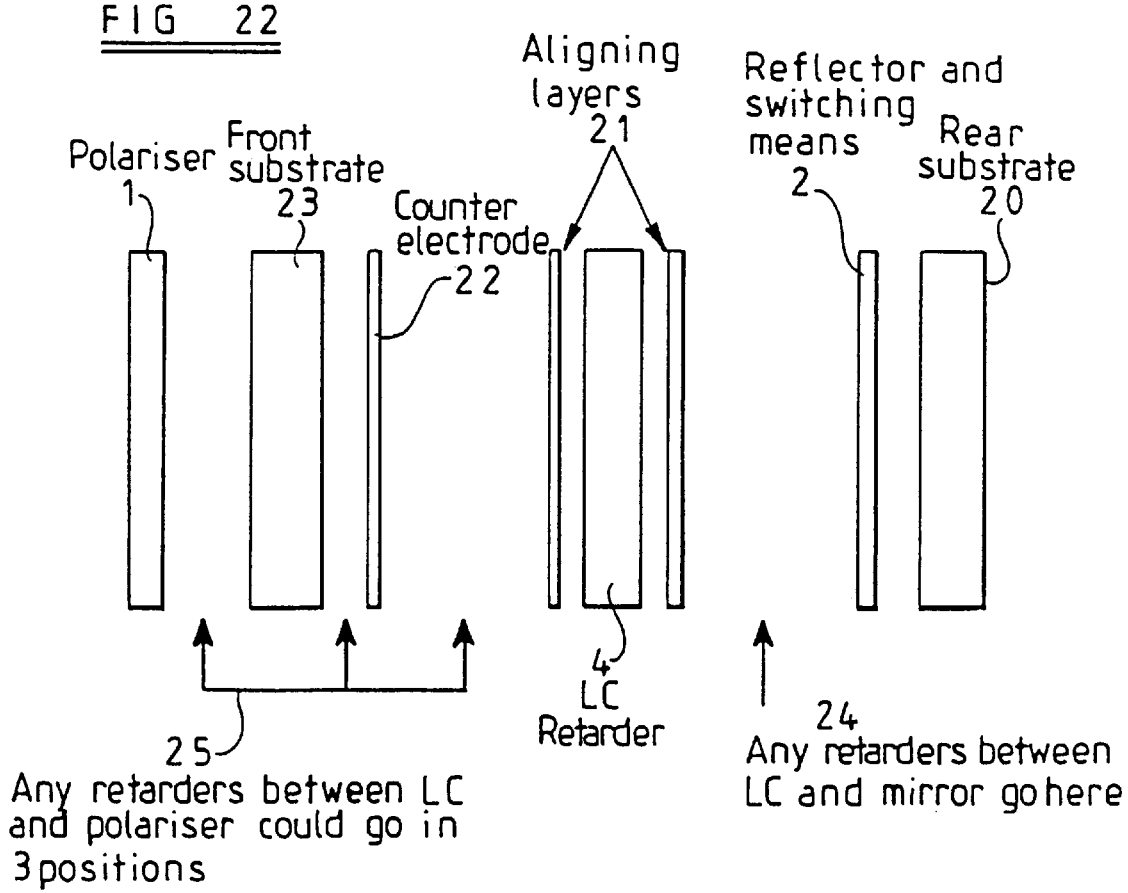
FIG. 22 is an exploded schematic diagram illustrating the general construction of the displays shown in the preceding figures.

FIG. 22 illustrates the construction of an LCD of any of the types described hereinbefore. The reflector 2 is incorporated with switching means and is formed on a rear substrate 20. For instance, the reflector may be electrically conductive and may be pixellated so as to provide individual picture element (pixel) electrodes for addressing a pixellated device. Active or passive matrix addressing electronics may be formed on the rear substrate for addressing the pixels of the LCD.

The reflector 2 may be a diffuse scattering reflector or a non-scattering reflector. In the case of a non-scattering reflector 2, additional optical elements may be required to provide some scattering of light in order to form a useful reflective device. For example, an optical control film (available from Sumitomo Chemical) may be laminated to the surface of the polariser 1 facing away from the reflector 2. Additional optical films, such as anti-reflection or anti-glare films, may be laminated to the display so as to enhance the appearance thereof.

The liquid crystal retarder 4 is associated with aligning layers 21 and is provided with a transparent counterelectrode 22 which may be formed of indium tin oxide (ITO). The counterelectrode 22 may be continuous or may be patterned, for instance when the display is driven by a passive matrix or by MIM (metal/insulator/metal) diodes. A transparent front substrate 23 is provided and may be formed of glass or plastics. The polariser 1 is shown outside the substrate 23 but may be formed inside the substrate.

If any fixed retarders are required between the liquid crystal retarder 4 and the reflector 2, they may be located in the position indicated by arrow 24. The gap between the liquid crystal retarder 4 and the reflector 2 should be minimised so as to avoid undesirable parallax effects, for instance in the case of pixellated devices. However, if parallax is not a problem, for instance where highly collimated light is used or where the device is used as an optical shutter, the reflector 2 and any associated retarder may be disposed behind the rear substrate 20. If any fixed retarders are required between the polariser 1 and the liquid crystal retarder 4, they may be provided in any of the three positions indicated by arrows 25.

Any of the fixed retarders may be made biaxial or an additional fixed retarder whose optic axis is parallel to an axis substantially perpendicular to the plane of the device may be provided to improve the viewing angle of the device.

In order to provide a colour display, the device may comprise absorbing or reflecting micro colour filters. In the case of reflecting colour filters, the reflector 2 may be formed by the filters. Absorbing filters may be disposed at any suitable location within the device structure, for instance on the interior surface of the front substrate 23.

A first example of a display of the type shown in FIG. 14 comprises a "normally black" display, ie: a display which is dark with no applied field across the liquid crystal retarder 4. The retarder 4 comprises a homogeneously aligned nematic liquid crystal having positive dielectric anisotropy. The liquid crystal may be parallel or anti-parallel aligned. The liquid crystal retarder 4 is arranged to provide substantially a quarter wavelength of retardation for zero applied voltage across the liquid crystal so that the display appears dark. When a voltage is applied to the retarder 4, the retardation thereof decreases and, as the voltage increases, the retardation decreases and approaches zero retardation.

The liquid crystal retarder 4 may be arranged to provide a retardation of 137 nanometers in the absence of an applied field and may be made of a liquid crystal known as LC ZLI-6476 available from Merck. The retarder 5 has a fixed retardation $d\Delta n$ substantially equal to 262 nanometers and is available from Nitto-Denko.

Figure 23:
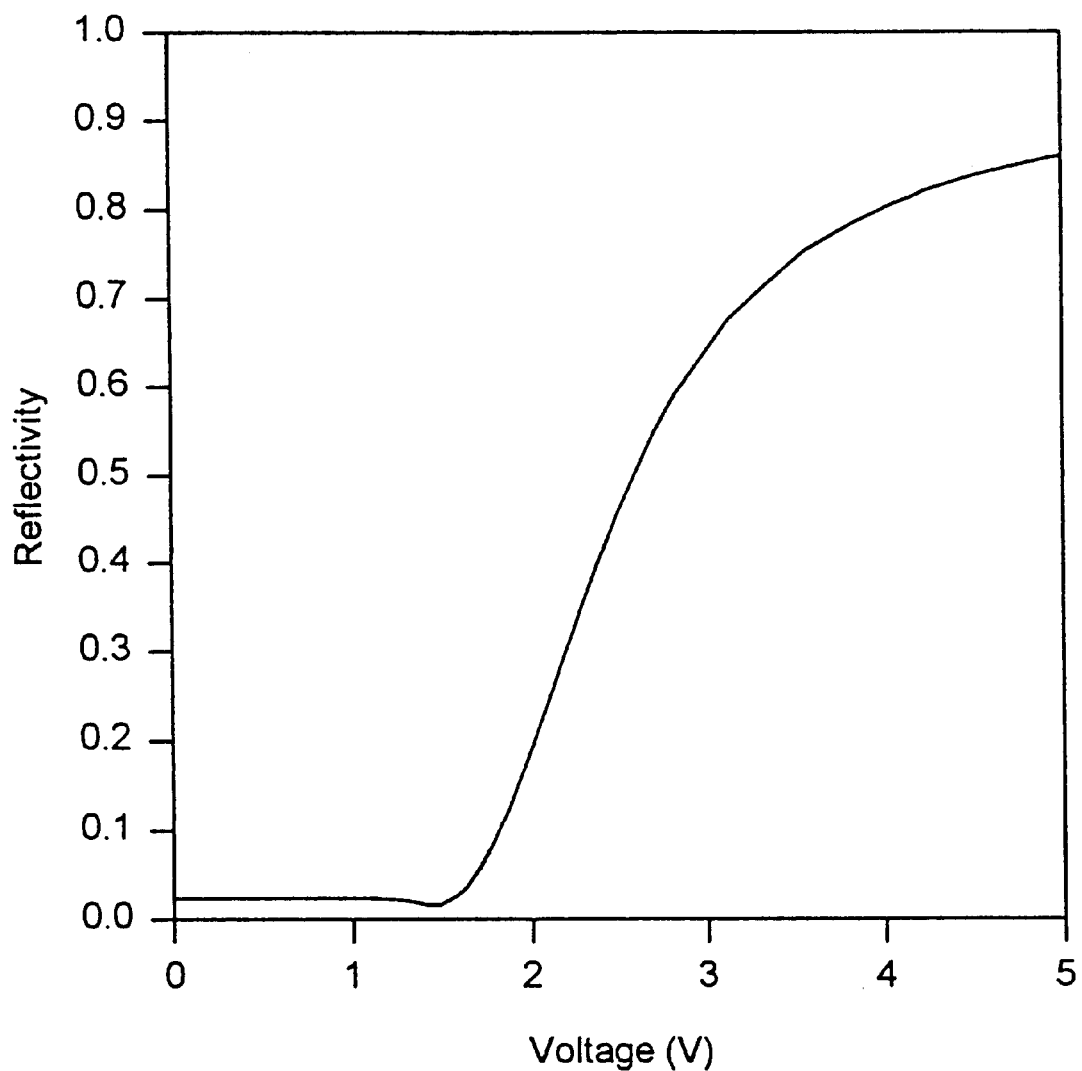
FIG. 23 is a graph of reflectivity against voltage of a normally black display constituting an embodiment of the invention.

The reflectivity of this example is illustrated in FIG. 23 as reflectivity against voltage.

Figure 24:
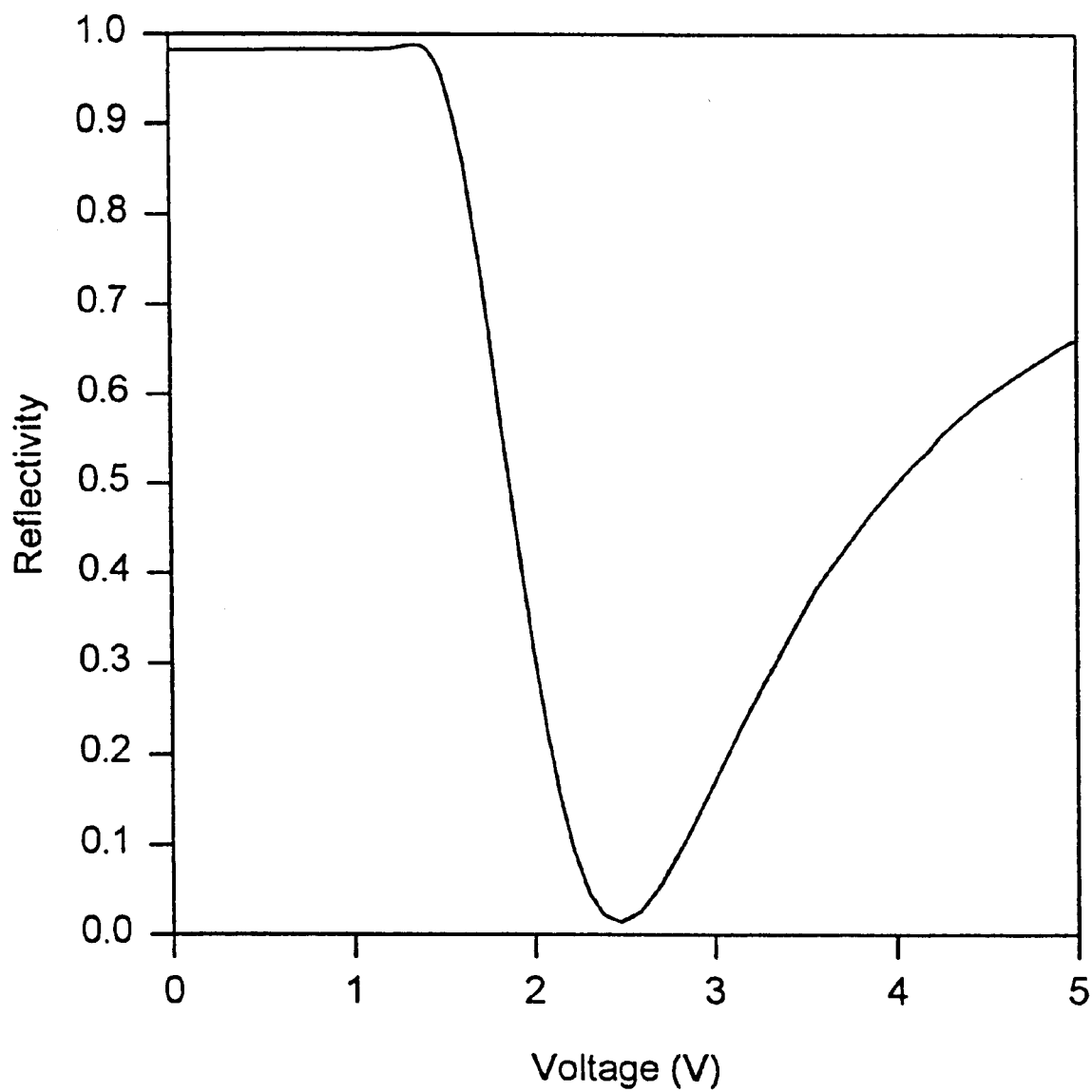
FIG. 24 and 25 are graphs of reflectivity against voltage for normally white displays constituting embodiments of the invention.

A second example of the embodiment shown in FIG. 14 differs from the first example in that it forms a "normally white" display and the homogeneously aligned nematic liquid crystal has a retardation at zero applied field of substantially half a wavelength. This may be achieved by increasing the thickness of the liquid crystal layer of the retarder to provide a retardation of 275 nanometers. The reflectivity against applied voltage of a typical device is illustrated in FIG. 24. As the applied voltage increases, the retardation decreases until it becomes a quarter wave so that the device appears dark and black.

Figure 25:
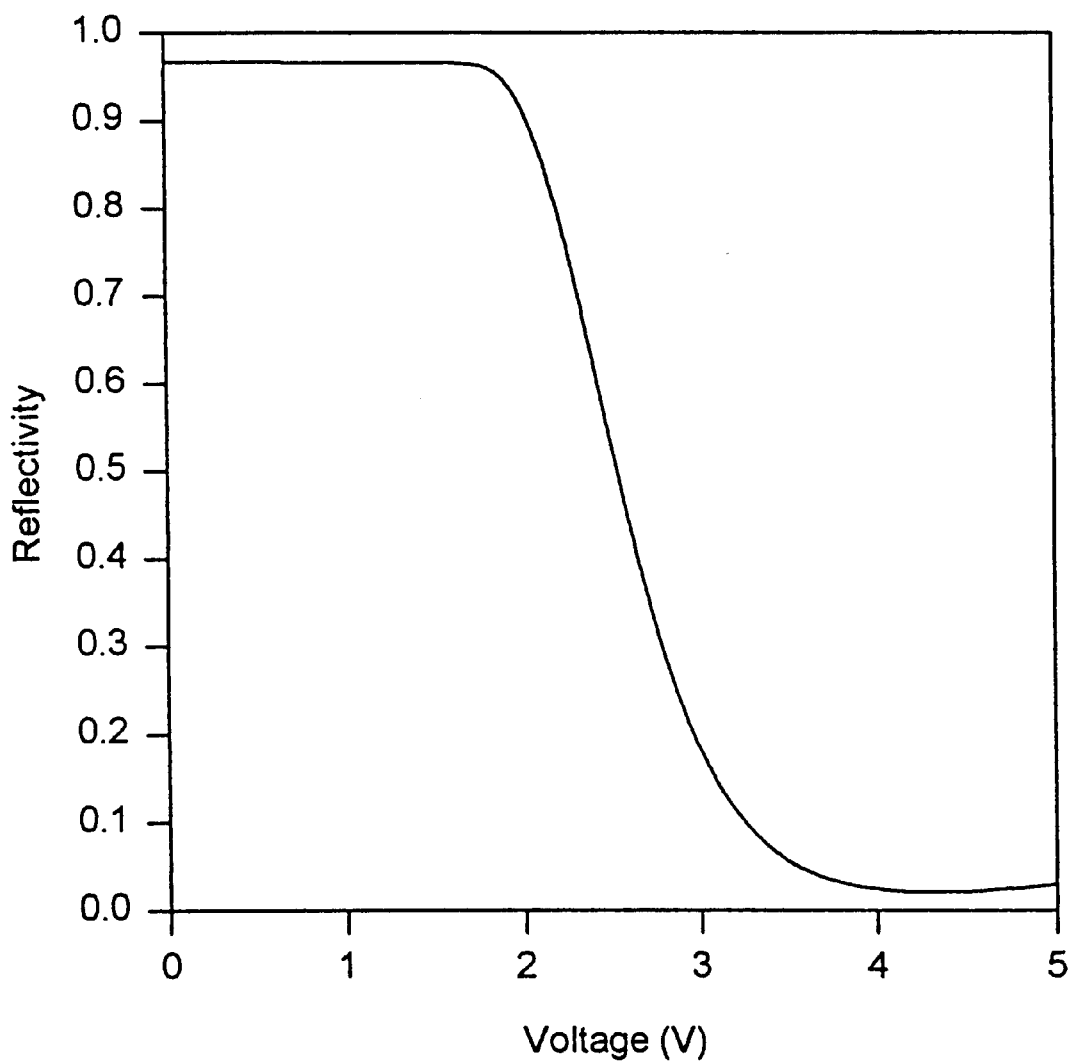

Another example of the embodiment illustrated in FIG. 14 provides a normally white display and differs from the previously described examples in that the liquid crystal retarder 4 comprises a homeotropically aligned nematic liquid crystal with negative dielectric anisotropy. The alignment may be parallel or anti-parallel and the homeotropic alignment should have a pretilt. When the applied voltage is substantially zero, the device appears bright as illustrated by the curve 13 in FIG. 15. As the applied voltage increases, the retardation of the liquid crystal retarder 4 increases and, when a quarter wave retardation is achieved, the device appears dark or black, as illustrated by the graph of reflectivity against voltage in FIG. 25.

This example differs in construction from the first and second examples in that the retarder 4 comprises a layer of liquid crystal of type LC ZIL-2806 available from Merck. The retardation of the layer is made substantially equal to 174 nanometers when substantially fully switched from the homeotropic state and a good dark state can be achieved for an applied voltage of 5 volts.

The other nematic out-of-plane liquid crystal retarders described hereinbefore may be embodied using the same techniques as for the three examples to provide normally black or normally white displays using homogeneous alignment, homeotropic alignment or a combination of both, such as hybrid aligned nematic (HAN).

As illustrated in FIG. 23, the reflectivity approaches but does not achieve a maximum value for increasing but finite applied voltages because the liquid crystal retarder 4 retains a finite retardation. This may be overcome by providing an extra fixed retarder whose optic axis is aligned at ±90° to the rubbing direction (optic axis) 8 of the retarder 4 and with a retardation which is sufficient to offset or cancel the residual retardation of the retarder 4. Such a technique is disclosed, for instance, by Shankar SPIE Vol 1166, page 461, 1989. Such an additional retarder may be disposed at either side of the liquid crystal retarder 4 and has a retardation such that, at zero applied voltage, the combined retardation of the liquid crystal retarder 4 and the additional retarder is substantially a quarter wave. As the applied voltage increases, the retardation of the liquid crystal layer decreases so as to be equal to that of the additional retarder at a predetermined finite voltage. The combined retardation is then zero and the device appears bright with a reflectivity corresponding to the curve 13 in FIG. 15.

Figure 26:
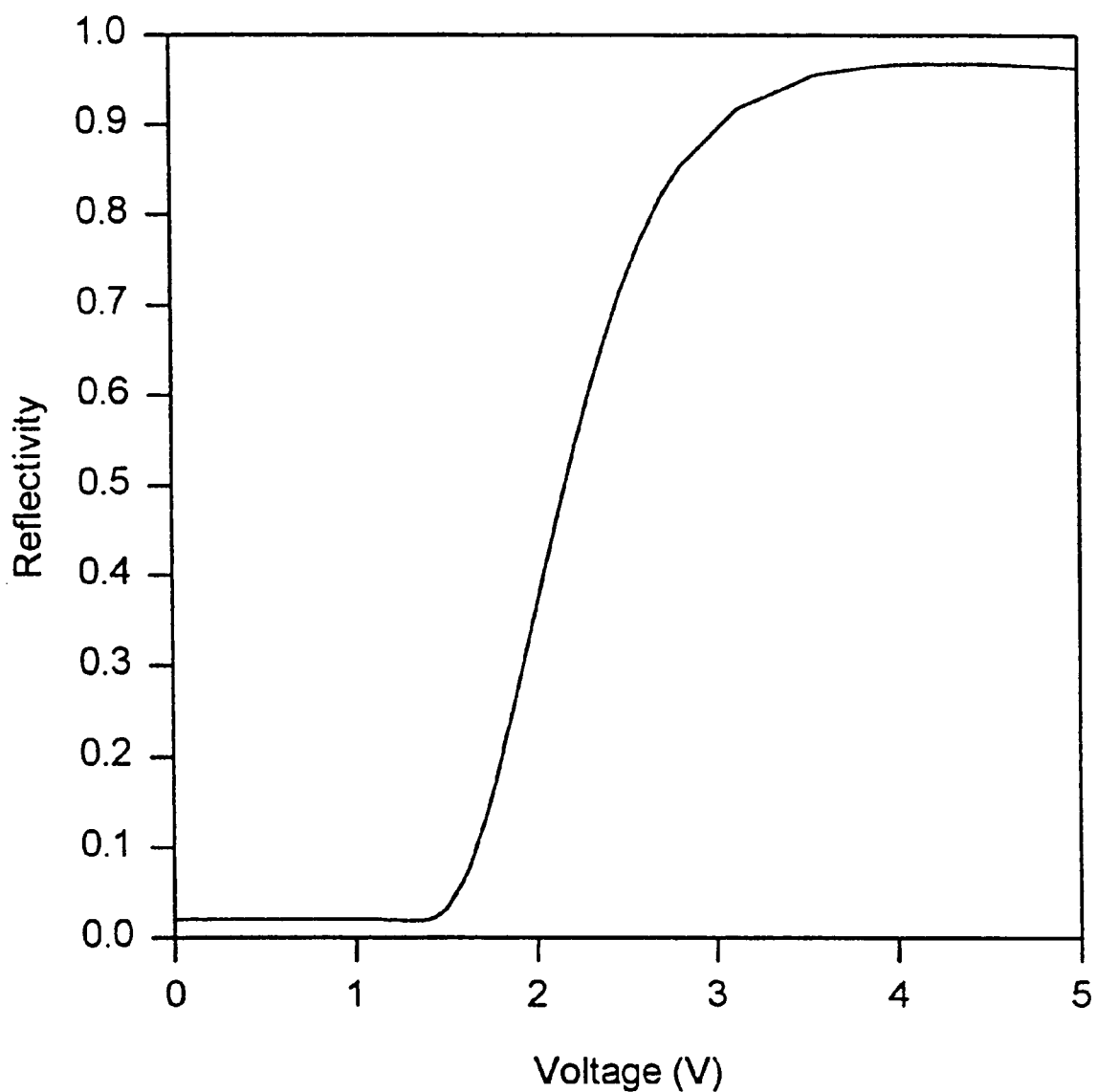
FIG. 26 is a graph of reflectivity against voltage for a normally black display constituting an embodiment of the invention.
Figure 27:
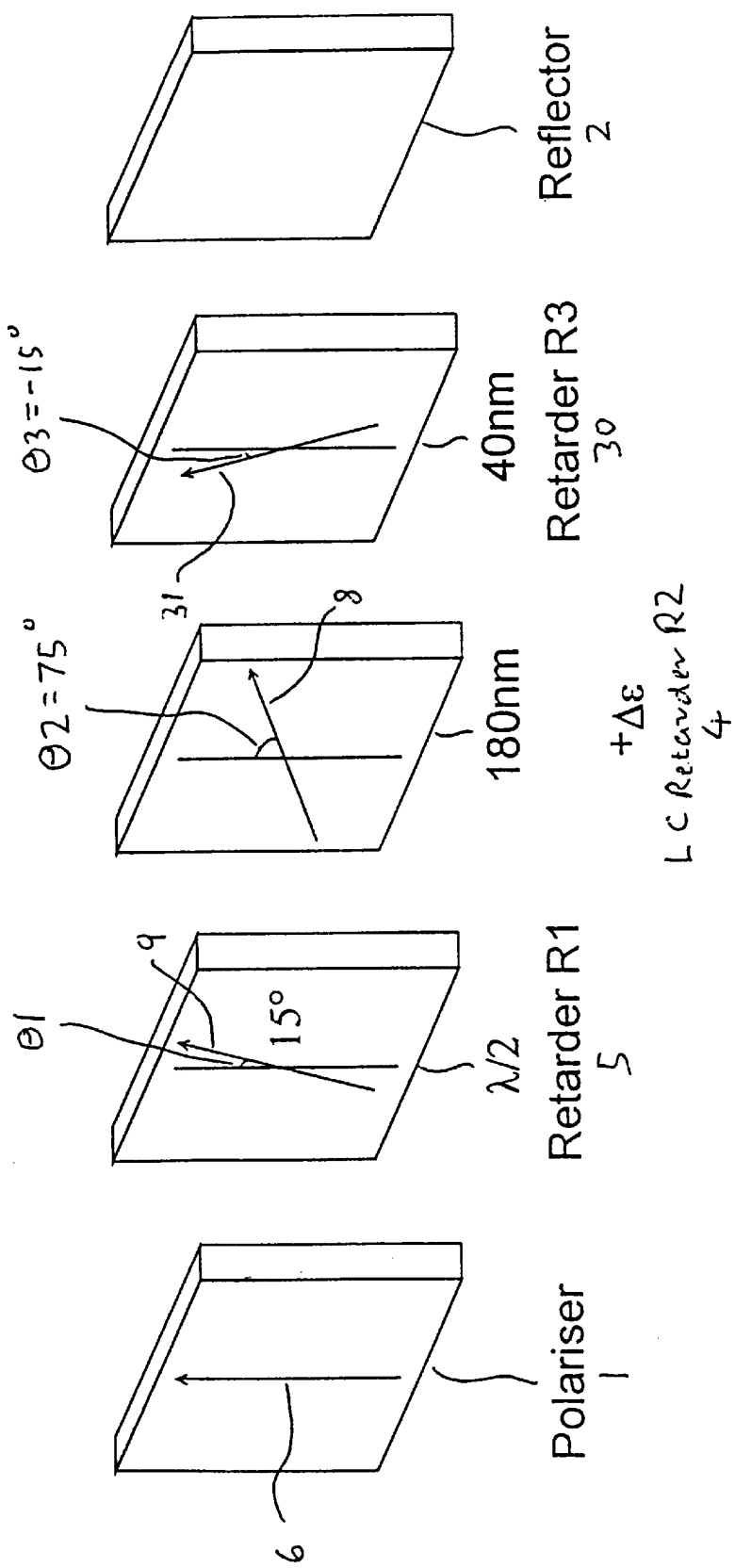
FIG. 27 is a view similar to FIG. 1 of a display constituting an eleventh embodiment of the invention.
Figure 28:
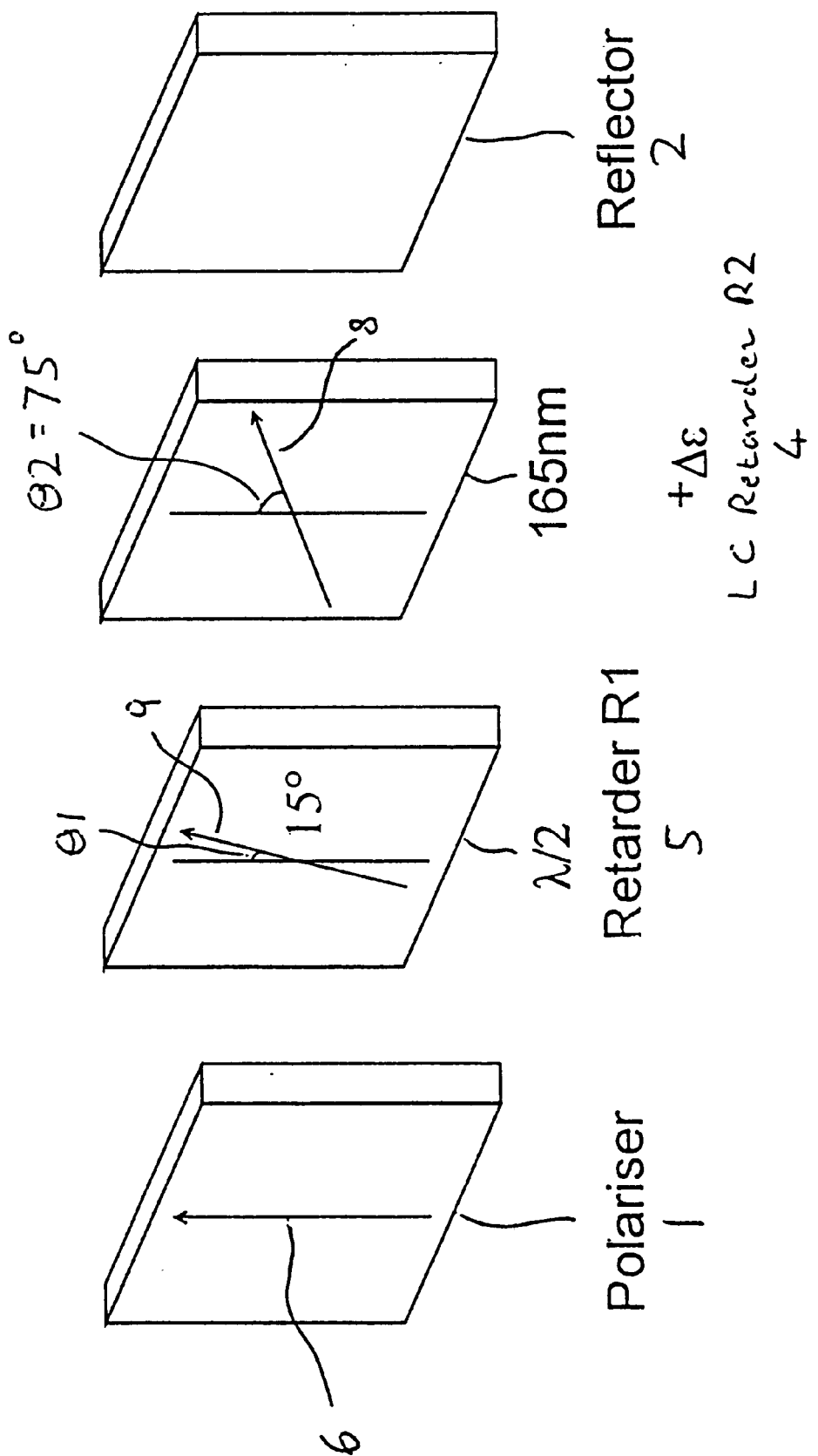
FIG. 28 is a view similar to FIG. 1 of a display constituting a twelfth embodiment of the invention.

An example of such a device differs from the first example described hereinbefore in that the liquid crystal retarder comprises LC ZLI 6476 available from Merck and arranged to provide a retardation with no applied voltage of 180 nanometers. The additional retarder is disposed between the reflector 2 and the liquid crystal retarder 4 and has a retardation of 40 nanometers. Such a retarder may be made of a reactive mesogen known as RM257 available from Merck. FIG. 27 illustrates such a device in which the additional retarder 30 has an optic axis 31 aligned at an angle θ3 to the polarising direction 6 of the polariser 1. In the example illustrated, the optic axis 31 is aligned at −15° to the polarising direction 6. The reflectivity against applied voltage is illustrated by the curve shown in FIG. 26 and is such that the maximum reflectivity is achieved at a finite voltage, such as 5 volts which is convenient for driving the device by thin film transistors.

Figure 29:
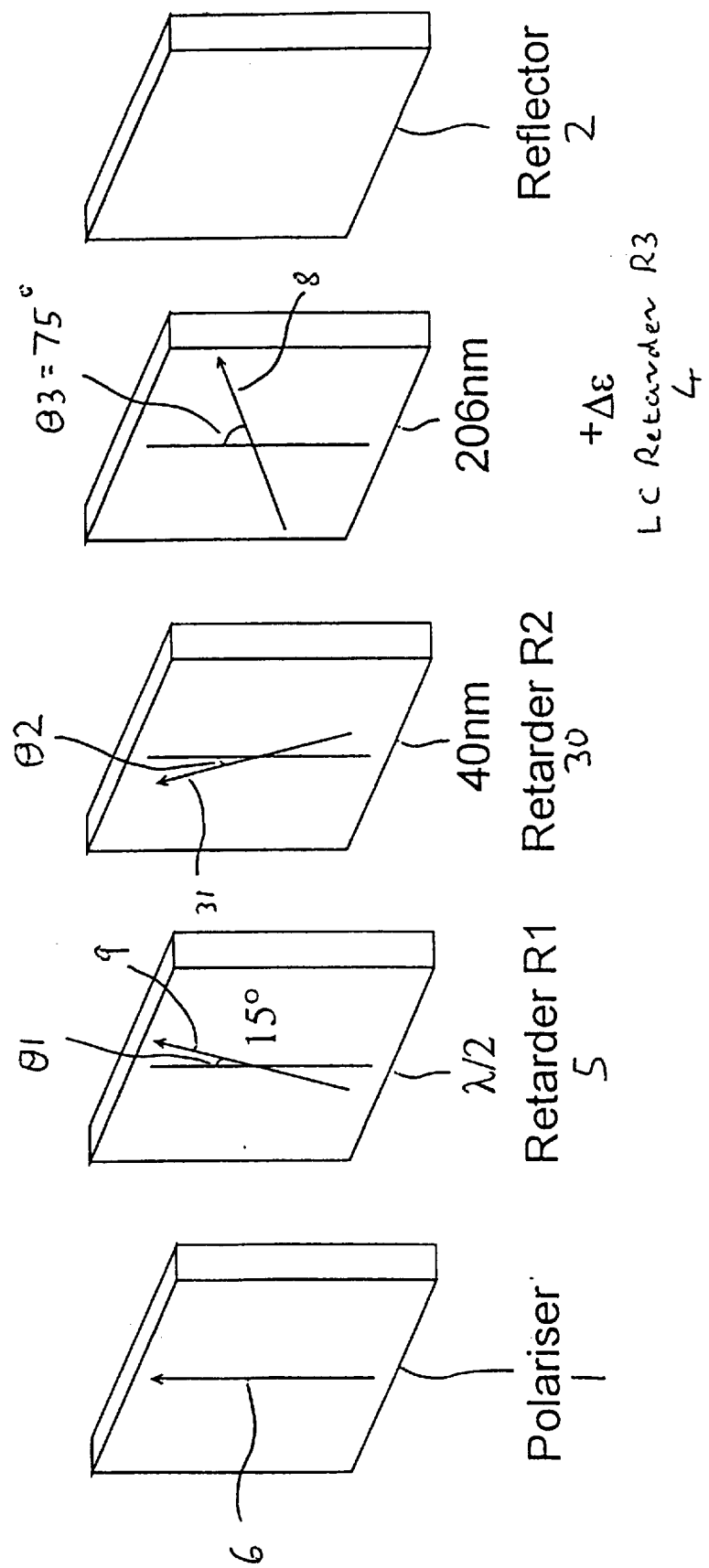
FIG. 29 is a view similar to FIG. 1 of a display constituting a thirteenth embodiment of the invention.
Figure 30:
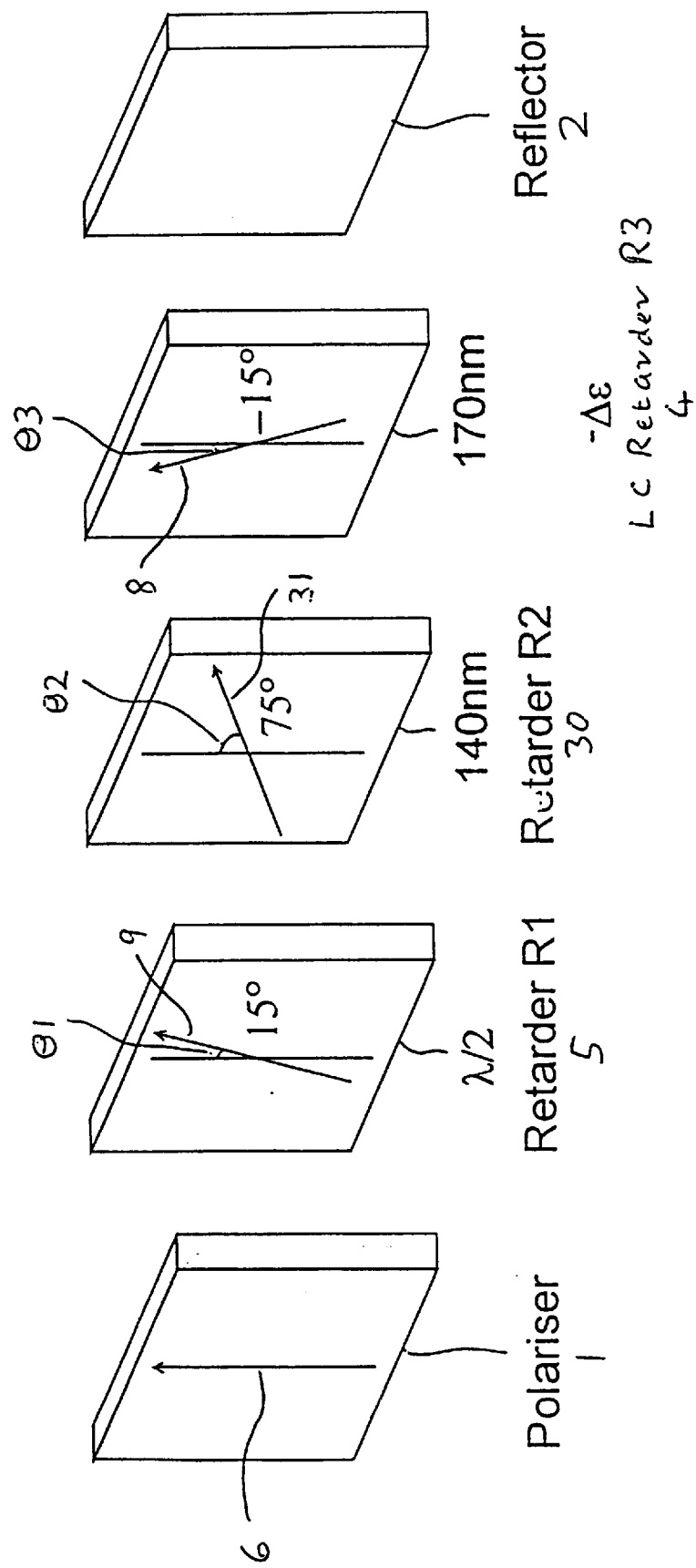
FIG. 30 is a view similar to FIG. 1 of a display constituting a fourteenth embodiment of the invention.

Using these techniques, it is possible to provide several different normally black and normally white reflective devices based on the use of two retarders with or without the additional retarder. Such devices are illustrated in FIG. 27 to 36 and in Tables 1 to 4 shown in FIGS. 37 to 40. The retarders are labelled R1, R2 and (when present) R3 in order from the polariser 1 to the reflector 2. The first retarder R1 5 is, in all of the embodiments illustrated, a half wave plate whose optic axis is aligned at α degrees to the polarising direction 6. In some of the embodiments such as that illustrated in FIG. 27, the retarder 5 is followed by the liquid crystal retarder 4 with the additional retarder 30 disposed between the liquid crystal retarder 4 and the reflector 2. In other embodiments, the retarder 5 is followed by the additional retarder 30 and the liquid crystal retarder 4 is disposed between the additional retarder 30 and the reflector 2, for instance as illustrated in FIG. 29. The generic details of the retarders R1, R2 and (when present) R3 are given in Tables 1 and 2. In these tables, R denotes a fixed retarder, for instance of the same type as the first retarder R1. I refers to fixed additional retarders 30 which may be made of a reactive mesogen such as RM257 as mentioned hereinbefore and which are preferably disposed on the inside of the rear substrate 20 adjacent to the reflector 2 so as to minimise parallax effects. Liquid crystal retarders whose retardations decrease with increasing applied voltage are denoted by $+\Delta\epsilon$ whereas those with retardations which increase with applied voltage are indicated by $-\Delta\epsilon$. Small arbitrary retardation values are denoted by σ and τ.

Specific examples of the devices illustrated in FIGS. 27 to 36 and in Tables 1 and 2 of FIGS. 37 and 38 are also illustrated by the angles and retardations indicated in FIGS. 27 to 36 and in Tables 3 and 4 of FIGS. 39 and 40. Tables 3 and 4 also give specific examples of suitable materials. Thus, the first retarders R1 and the retarders denoted by R may be of the types which are commercially available, for example, from Nitto-Denko. 2806 refers to the liquid crystal LC ZIL-2806 whereas 6476 refers to the liquid crystal LC ZIL-6476, both available from Merck. RM257 refers to reactive mesogen 257 also available from Merck.

Figure 31:
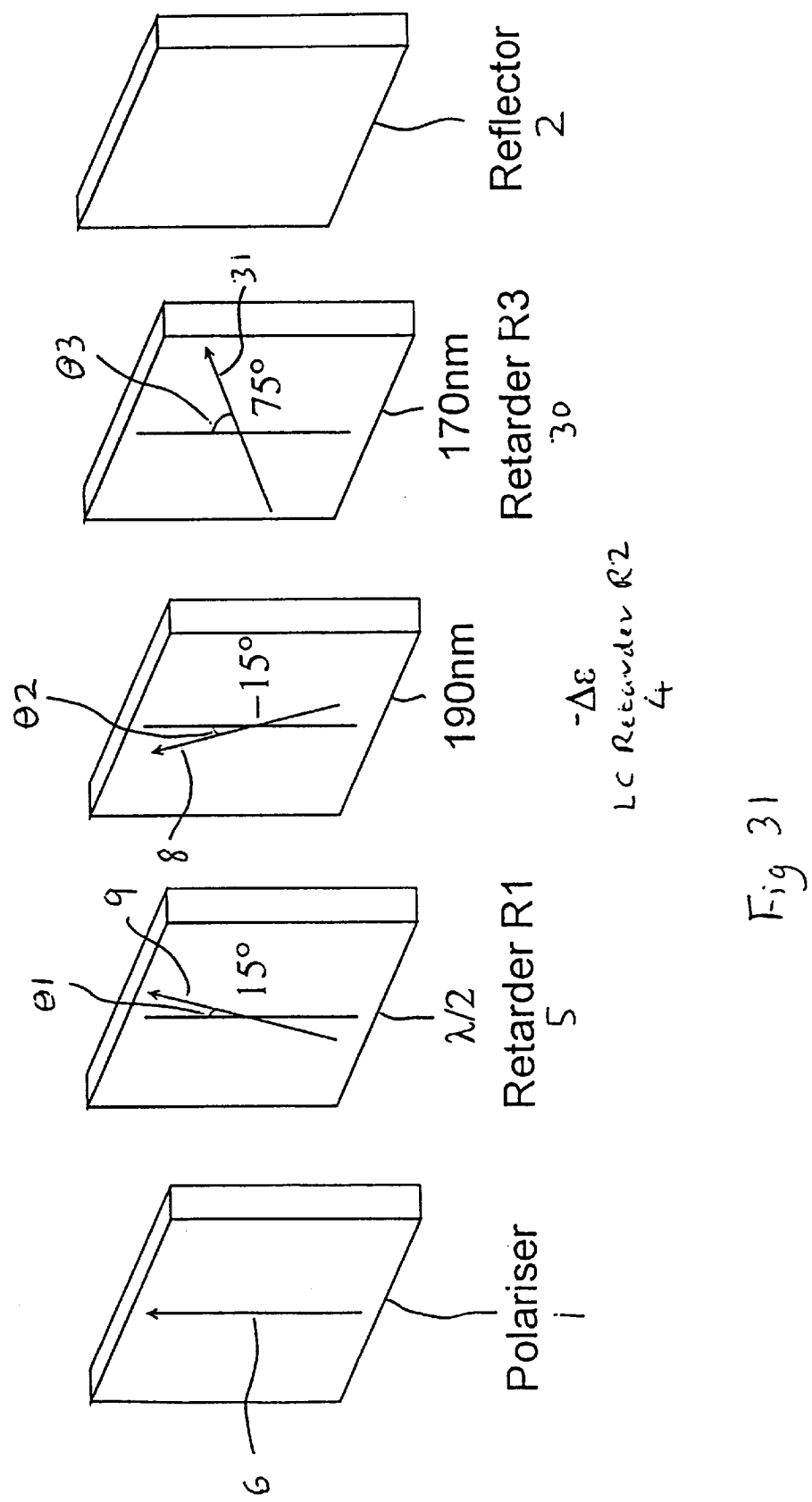
FIG. 31 is a view similar to FIG. 1 of a display constituting a fifteenth embodiment of the invention.
Figure 32:
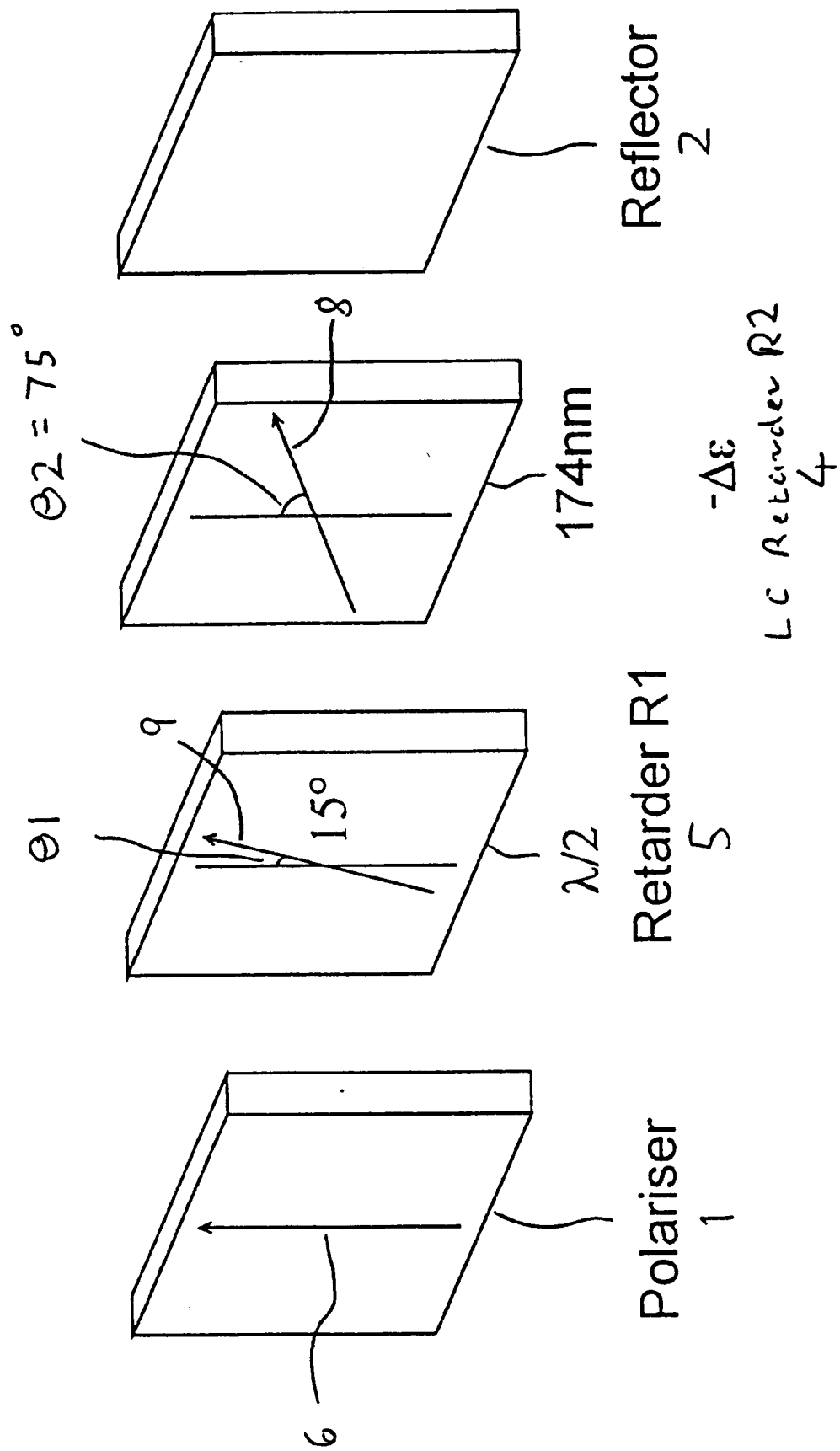
FIG. 32 is a view similar to FIG. 1 of a display constituting a sixteenth embodiment of the invention.
Figure 33:
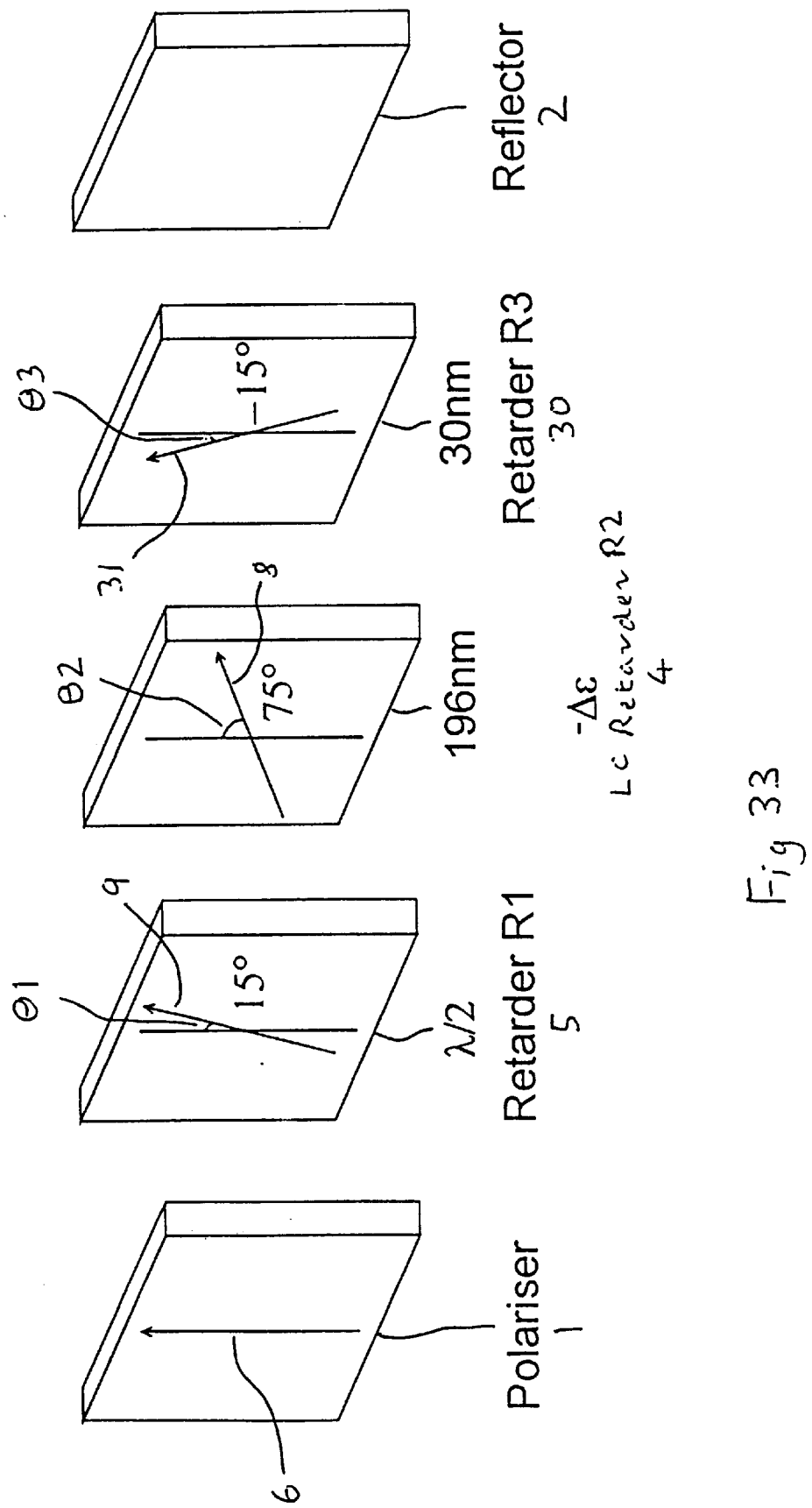
FIG. 33 is a view similar to FIG. 1 of a display constituting a seventeenth embodiment of the invention.
Figure 34:
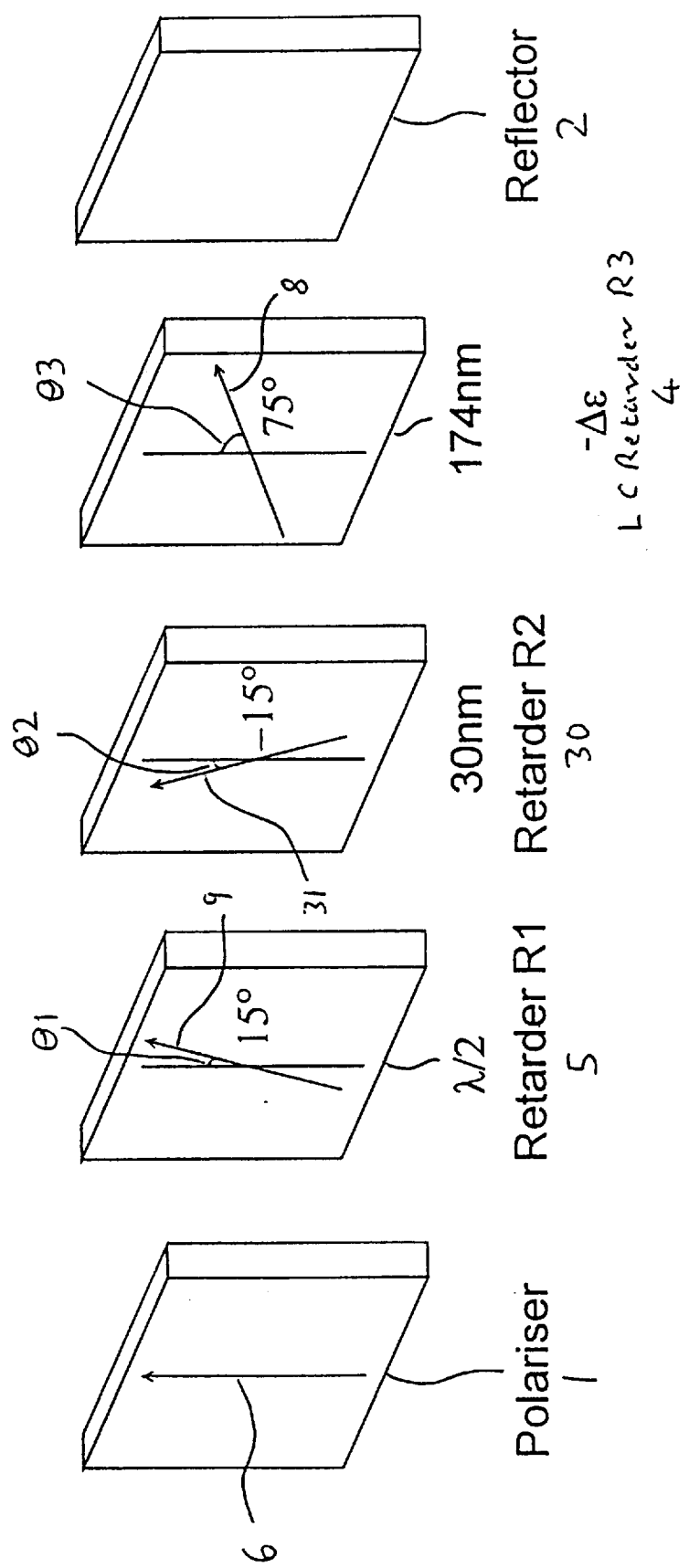
FIG. 34 is a view similar to FIG. 1 of a display constituting an eighteenth embodiment of the invention.
Figure 3S:
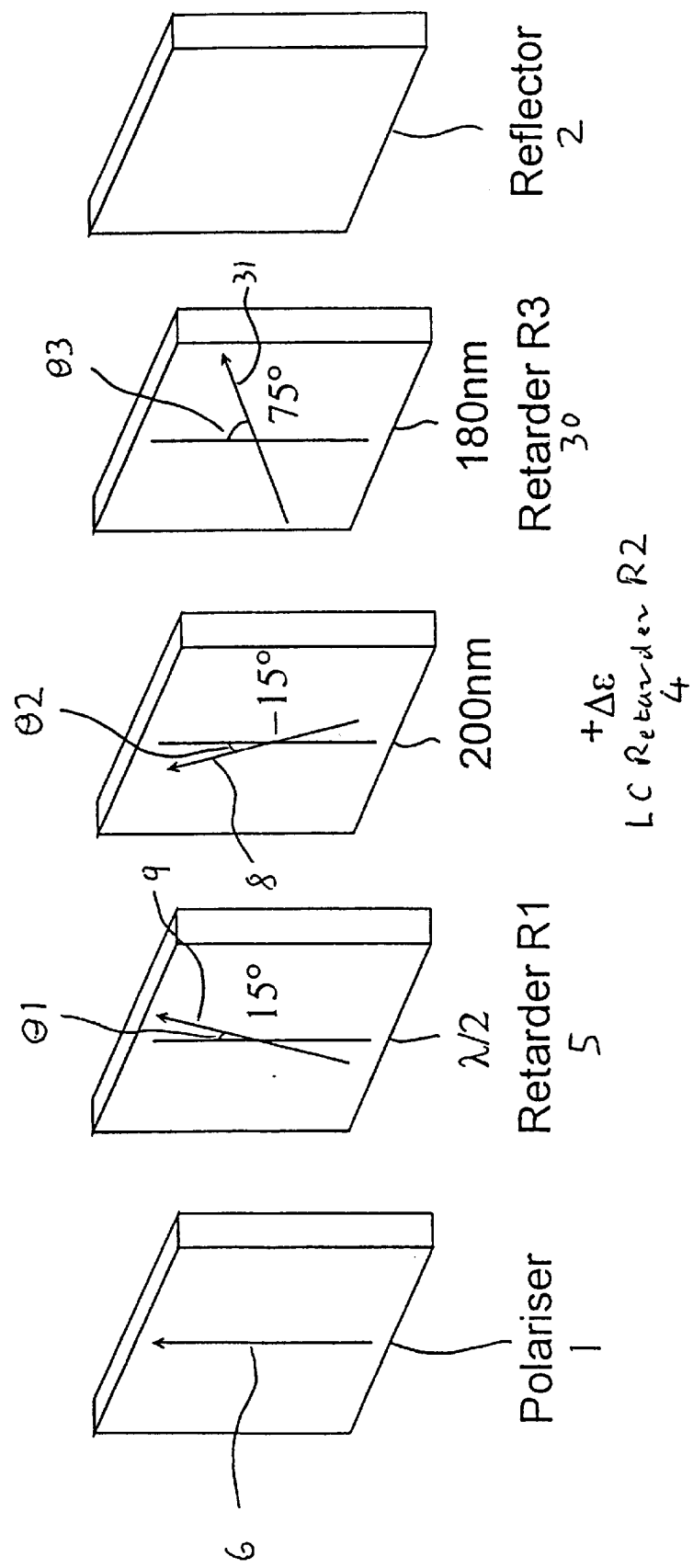
Figure 36:
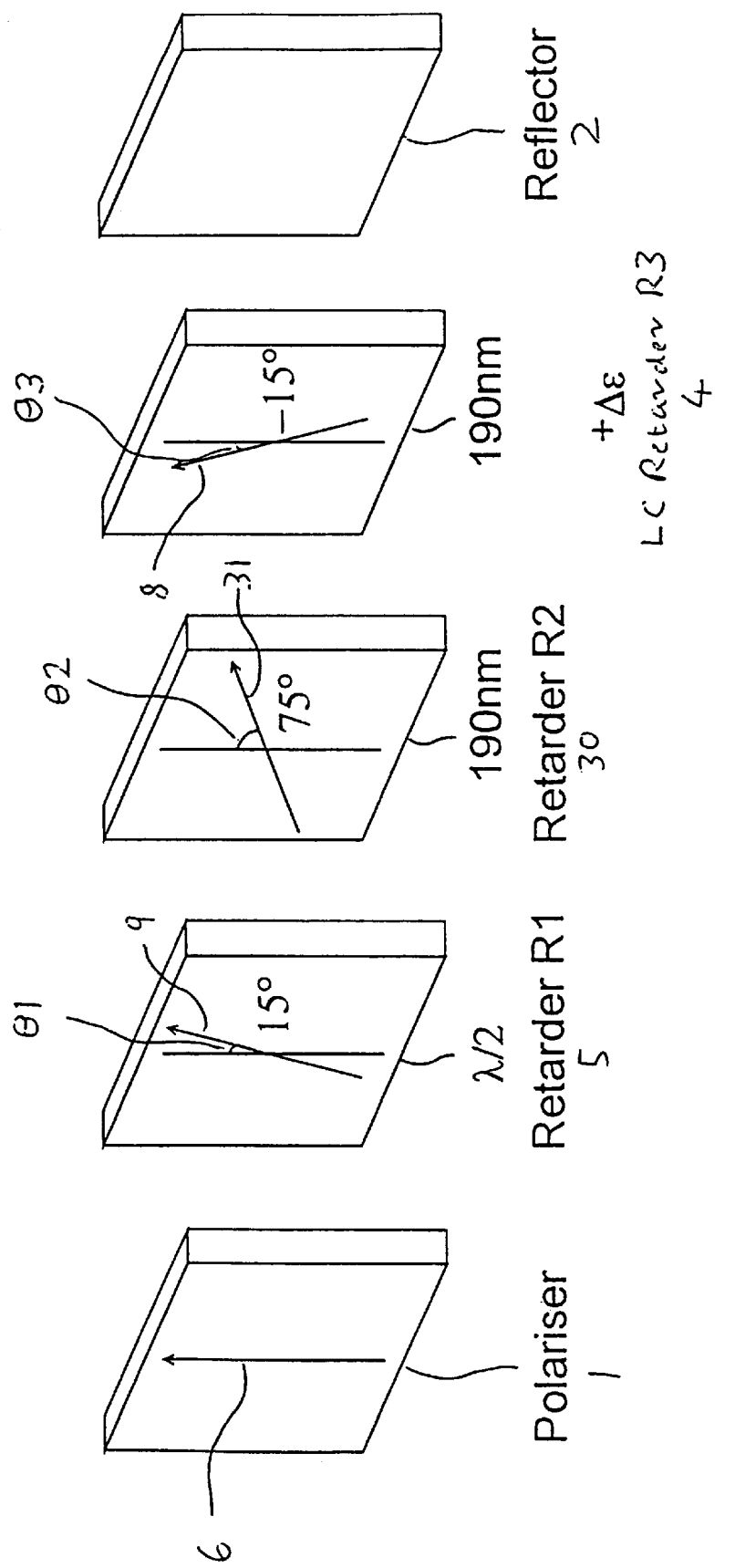
FIG. 36 is a view similar to FIG. 1 of a display constituting a twentieth embodiment of the invention.

The two specified liquid crystals in these examples have a low birefringence. Although this is not necessary, it may be advantageous in that a larger cell thickness is required to achieve the desired retardation dΔn. Such thicker cells are easier to fabricate and result in a lower variation in retardation across the area of the device. The pre-tilts of the liquid crystal in the examples illustrated in FIGS. 31 and 33 are larger than the pre-tilts in the examples illustrated in FIGS. 30 and 34, respectively.

Figure 41:
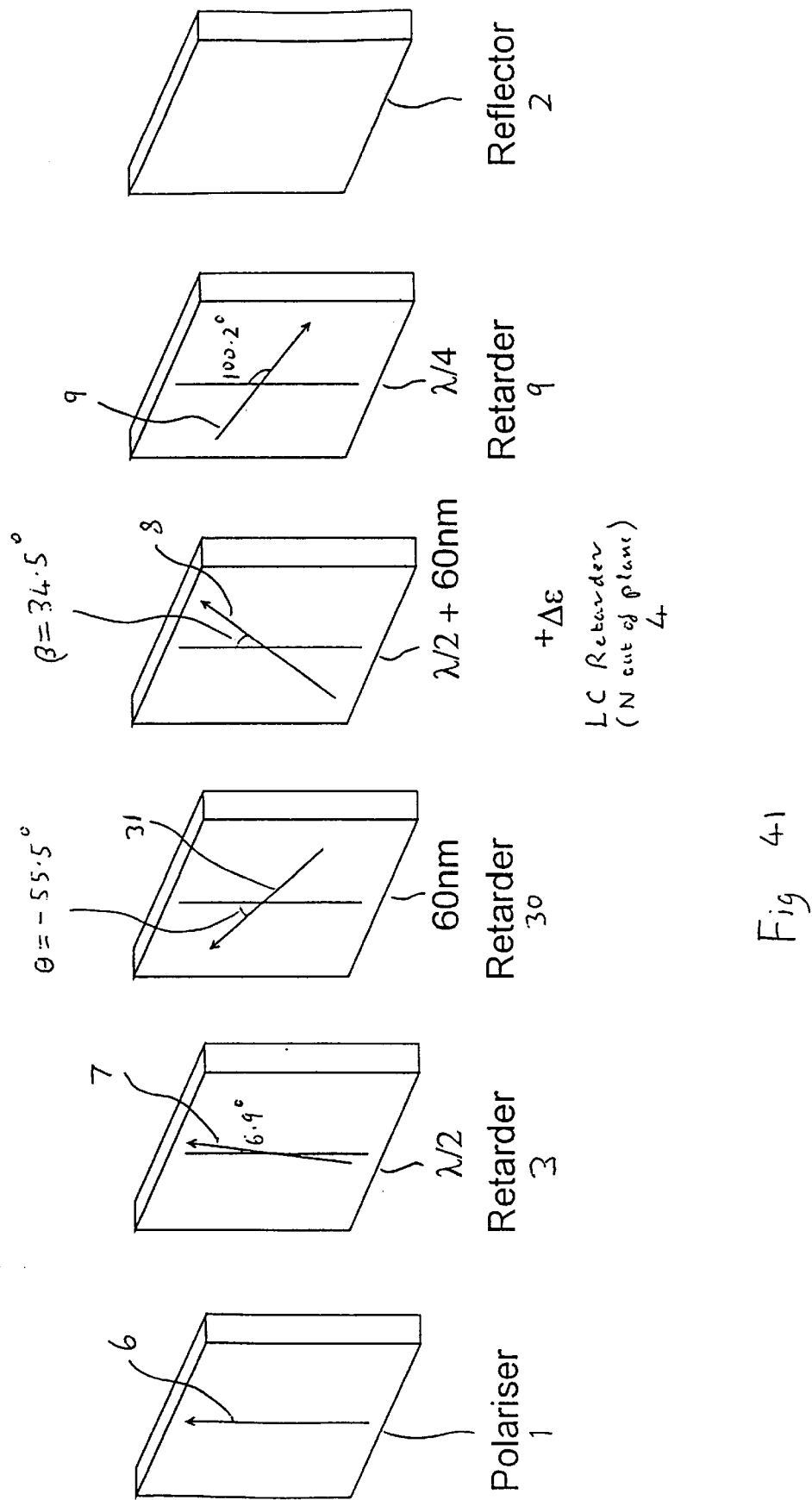
FIG. 41 is a view similar to FIG. 1 of a display constituting a twenty first embodiment of the invention.

The use of an additional fixed retarder to cancel residual retardation of a liquid crystal retarder may likewise be applied to the other "two retarder" and "three retarder" embodiments, for instance of the type illustrated in FIG. 1. FIG. 41 illustrates an example of such a device with the additional retarder 30 being disposed between the fixed retarder 3 and the liquid crystal retarder 4. The optic axis 31 of the additional retarder 30 is aligned at an angle 0 of ±90° with respect to the optic axis (rubbing direction) of the liquid crystal retarder 4. In the example shown, θ is—55.5°. The additional retarder 30 has a relatively small retardation, such as 60 nanometers, to provide a normally black display. The retardation of the retarder 4 is increased to about $\lambda/2+60$ nanometers so that a fully normalised bright state can be obtained for a finite applied voltage which is compatible with thin film transistor driving techniques.

Thus, all embodiments which use out-of-plane switching nematic liquid crystal retarders 4 may include the additional retarders providing a retardation dependent on the mode (normally black or normally white) of operation and on whether the liquid crystal material has a retardation which increases or decreases with applied voltage.

The angles of the optic axes of the retarders and the retardations described hereinbefore are believed to be the optimum values for each of the embodiments. However, small variations from these optimum values are possible and permit adequate displays to be made. For instance, the dark state reflectivity increases to about 0.2 for the two retarder and three retarder devices without additional fixed retarders as described hereinbefore when the angles and retardations vary by the amounts shown in Table 5 of FIG. 42.

Figure 43:
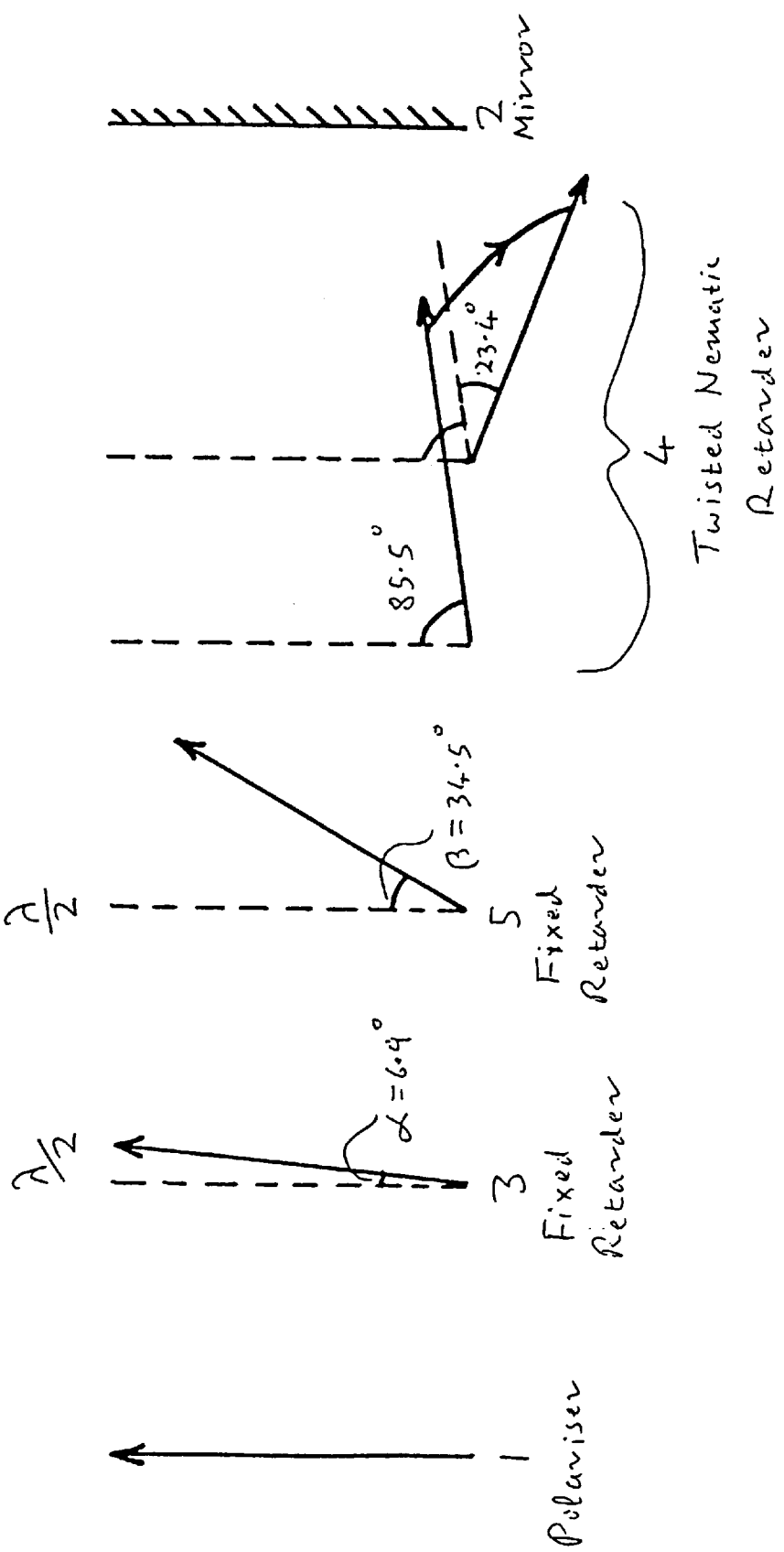
FIG. 43 is a view similar to FIG. 1 of a display constituting a twenty second embodiment of the invention.

FIG. 43 illustrates a device of the type shown in FIG. 7 but in which the out-of-plane nematic liquid crystal retarder is replaced by a twisted nematic retarder. The retarder 4 has a twist angle of 23.4° and a retardation of 142.8 nanometers. The input director (ie: the liquid crystal director of the surface of retarder 4 facing the retarder 5) is at an angle of 85.5° to the polarising axis of the polariser 1.

The device shown in FIG. 43 is a typical example of "three retarder devices" in which the uniform $\lambda/4$ retarder is replaced by a twisted nematic retarder designed in accordance with Beynon et al, Proceedings of the IDRC 1997, page L34, the contents of which are incorporated herein by reference. This paper provides a general formula for calculating the parameters of a twisted layer to convert between linearly polarised light and circularly polarised light.

Figure 44:
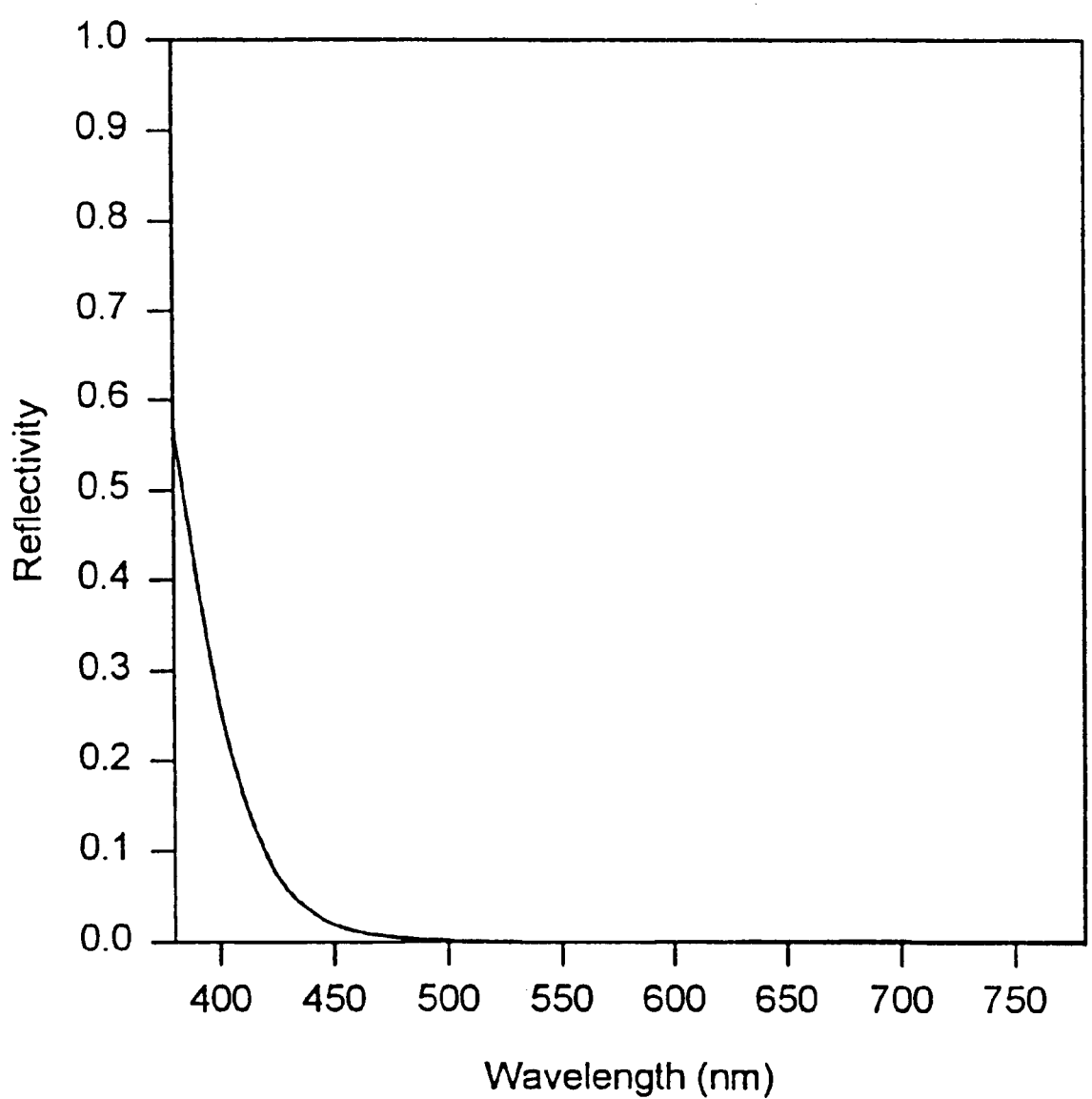
FIG. 44 is a graph similar to FIG. 3 illustrating the dark state performance of the display of FIG. 43.
Figure 46:
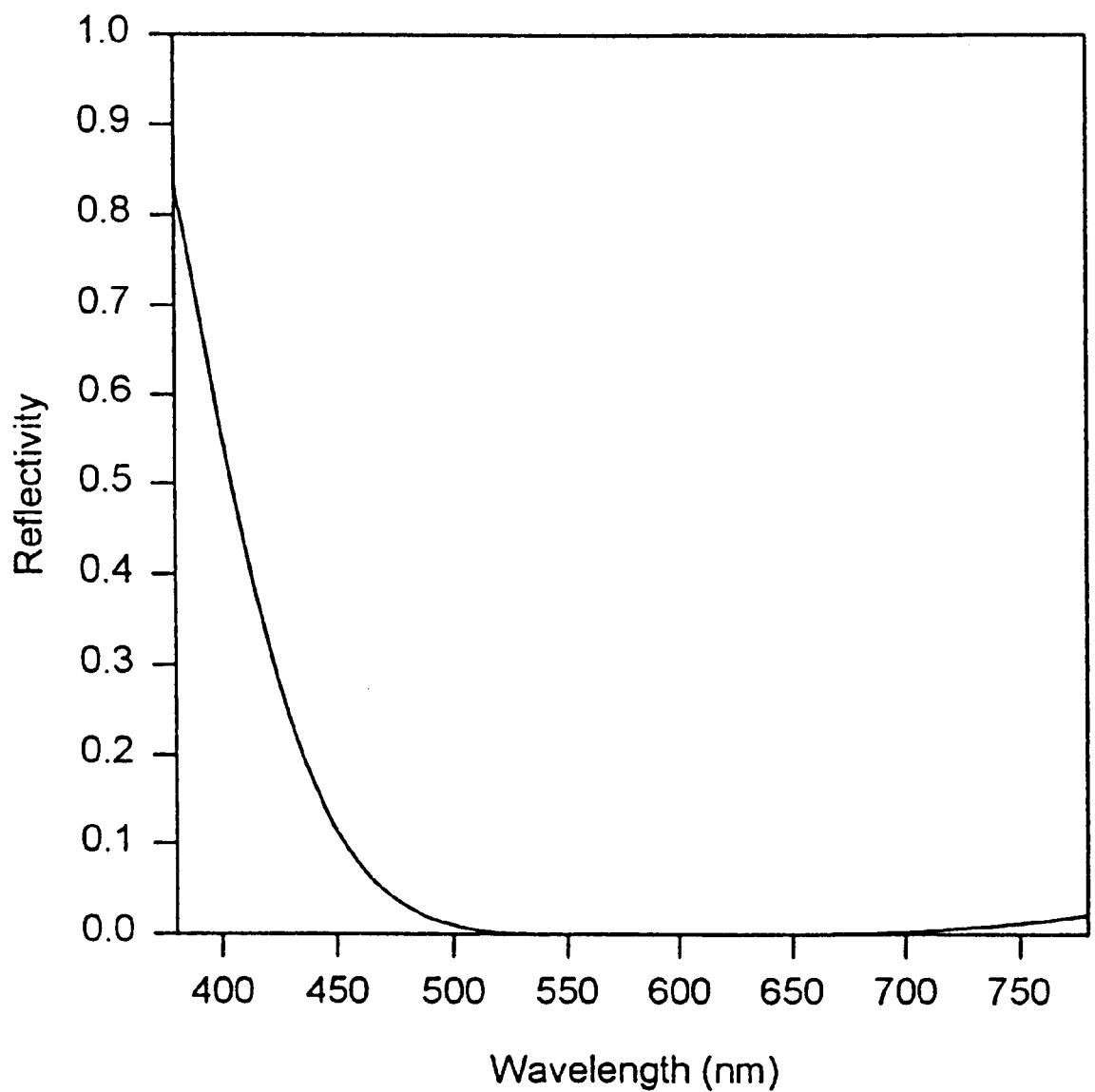
FIG. 46 is a graph similar to FIG. 3 illustrating the dark state performance of the display of FIG. 45.

FIG. 44 illustrates the dark state performance of the device of FIG. 43. Thus, the device achieves a good achromatic dark state. 1The same techniques may be applied to two retarder devices and an example of this is illustrated in FIG. 45, which shows a device of the type shown in FIG. 14 with the out-of-plane nematic liquid crystal retarder replaced by a twisted liquid crystal retarder. The input director of the retarder 4 is at an angle of 54.1° with respect to the polarising axis of the polariser 1. The twist angle of the retarder 4 is 32.3° and the retarder provides a retardation of 269 nanometers. The dark state performance of the device shown in FIG. 45 is illustrated in FIG. 46 and, again, a good achromatic dark state can be achieved.

What is claimed is:

1. A reflective liquid crystal device, comprising:

a linear polariser;

a polarisation preserving reflector, and at least two retarders including a first retarder disposed between the polariser and the reflector and a second retarder disposed between the first retarder and the reflector, at least one of the first and second retarders including an untwisted liquid crystal layer which is switchable to achieve a non-reflective state of the liquid crystal device, in which the total retardation of the at least two retarders is equal to $(2n+1)\lambda/4$, where n is an integer and $\lambda$ is a wavelength of visible light, and a reflective state of the reflective liquid crystal device, wherein an optic axis of the liquid crystal layer is switched so as to vary the retardation.

2. A device according to claim 1, wherein in the non-reflective device state, the first retarder has a retardation of substantially $\lambda/2$ and the second retarder has a retardation of substantially $\lambda/4$.

3. A device according to claim 2, wherein in the non-reflective device state, the optic axis of the first retarder is substantially at an angle of $(\alpha+E.180°)$ to the polarisation or absorption axis of the polariser and the optic axis of the second retarder is substantially at an angle of $(2\alpha+\text{sign}(\alpha).45°+F.180°)$ to the polarisation or absorption axis, where E and F are integers and sign ($\alpha$) is the sign of $\alpha$.

4. A device according to claim 3, wherein a is substantially equal to 15°.

5. A device according to claim 1, wherein the first retarder comprises the liquid crystal layer having a retardation which is switchable between substantially $(p\lambda/2+\delta)$ and substantially $((p+1)\lambda/2+\delta)$ where p is an integer, and $0 \leq \delta < \lambda/2$.

6. A device according to claim 5, wherein p is equal to zero or one.

7. A device according to claim 1, wherein the second retarder comprises the liquid crystal layer and has a retardation which is switchable between substantially $(q\lambda/4+\delta)$ and substantially $((q+1)\lambda/4+\delta)$, where q is an integer, and $0 \leq \delta < \lambda/4$.

8. A device according to claim 7, wherein q is equal to zero or one.

9. A device according to claim 1, wherein the liquid crystal layer is a nematic liquid crystal.

10. A device according to claim 1, wherein the liquid crystal layer includes a liquid crystal selected from a homogeneously aligned nematic liquid crystal, a homeotropically aligned nematic liquid crystal, and a hybrid aligned nematic liquid crystal.

11. A device according to claim 1 wherein the retarder arrangement includes a further retarder whose optic axis is substantially perpendicular to the optic axis of the liquid crystal layer and which is disposed optically adjacent the liquid crystal layer.

12. A device according to claim 1, wherein the at least two retarders includes a further retarder whose optic axis is substantially perpendicular to the optic axis of the liquid crystal layer and which is disposed optically adjacent the liquid crystal layer, and wherein the further retarder has a retardation substantially equal to δ, where $0 \leq \delta\lambda/2$.

13. A device according to claim 11, having the retarder arrangement including the further retarder whose optic axis is substantially perpendicular to the optic axis of the liquid crystal layer and which is disposed optically adjacent the liquid crystal layer, wherein the further retarder has a retardation substantially equal to the retardation of the liquid crystal layer in the absence of an applied field across the liquid crystal layer.

14. A device according to claim 1, wherein n=0.

15. A device according to claim 1, wherein $\lambda$ is between substantially 500 and substantially 570 nanometers.

16. A device according to claim 15, wherein $\lambda$ is between substantially 510 and substantially 550 nanometers.

17. A device according to claim 1, wherein the retarder arrangement has a retardation substantially equal to $m\lambda/2$ in the reflective device state, where m is an integer.

18. A device according to claim 1, wherein the liquid crystal layer is homogeneously aligned at a first surface and homeotropically aligned at a second surface.

19. A device according to claim 1, wherein the liquid crystal layer is parallel-aligned.

20. A device according to claim 1, wherein the liquid crystal layer is antiparallel-aligned.

21. A reflective liquid crystal device, comprising:
a linear polariser;
a polarisation preserving reflector; and
at least two retarders including a first retarder disposed between the polariser and the reflector and a second retarder disposed between the first retarder and the reflector, at least one of the first and second retarders including a liquid crystal layer which is switchable to achieve a non-reflective state of the liquid crystal device, in which the total retardation of the at least two retarders is equal to $(2n+1)\lambda/4$, where n is an integer and $\lambda$ is a wavelength of visible light, and a reflective state of the reflective liquid crystal device,
wherein at least one of the first and second retarders includes a twisted retarder, and
the liquid crystal layer is switched so as to vary the retardation of the retarder.

22. A device according to claim 21, wherein the liquid crystal layer includes a liquid crystal selected from a homogeneously aligned nematic liquid crystal, a homeotropically aligned nematic liquid crystal, and a hybrid aligned nematic liquid crystal.

23. A device according to claim 21, wherein the retarder arrangement includes a further retarder whose optic axis is substantially perpendicular to the optic axis of the liquid crystal layer and which is disposed optically adjacent the liquid crystal layer.

24. A device according to claim 21, wherein the at least two retarders includes a further retarder whose optic axis is substantially perpendicular to the optic axis of the liquid crystal layer and which is disposed optically adjacent the liquid crystal layer, and
wherein the further retarder has a retardation substantially equal to $\delta$, where $0 \leq \delta \lambda/2$.

25. A device according to claim 23, having the retarder arrangement including the further retarder whose optic axis is substantially perpendicular to the optic axis of the liquid crystal layer and which is disposed optically adjacent the liquid crystal layer,
wherein the further retarder has a retardation substantially equal to the retardation of the liquid crystal layer in the absence of an applied field across the liquid crystal layer.

26. A device according to claim 1, wherein n=0.

27. A device according to claim 21, wherein $\lambda$ is between substantially 500 and substantially 570 nanometers.

28. A device according to claim 27, wherein $\lambda$ is between substantially 510 and substantially 550 nanometers.

29. A device according to claim 21, wherein the retarder arrangement has a retardation substantially equal to $m\lambda/2$ in the reflective device state, where m is an integer.

30. A device according to claim 1, wherein the liquid crystal layer is homogeneously aligned at a first surface and homeotropically aligned at a second surface.

31. A device according to claim 21, wherein the liquid crystal layer is parallel-aligned.

32. A device according to claim 21, wherein the liquid crystal layer is antiparallel-aligned.

* * * * *

UNITED STATES PATENT AND TRADEMARK OFFICE
CERTIFICATE OF CORRECTION

PATENT NO. : 6,577,364 B1
DATED : June 10, 2003
INVENTOR(S) : Martin Daivd Tillin et al.

Page 1 of 1

It is certified that error appears in the above-identified patent and that said Letters Patent is hereby corrected as shown below:

<u>Title page,</u>
Item [73], should read:
-- [73] Assignee: Sharp Kabushiki Kaisha, Osaka (JP) --

Signed and Sealed this

Tenth Day of August, 2004

JON W. DUDAS
*Acting Director of the United States Patent and Trademark Office*